United States Patent [19]
Tavallaei et al.

[11] Patent Number: 5,907,689
[45] Date of Patent: May 25, 1999

[54] MASTER-TARGET BASED ARBITRATION PRIORITY

[75] Inventors: Siamak Tavallaei; Gary B. Kotzur, both of Spring, Tex.

[73] Assignee: Compaq Computer Corporation, Houston, Tex.

[21] Appl. No.: 08/777,826

[22] Filed: Dec. 31, 1996

[51] Int. Cl.[6] .................................................. G06F 13/00
[52] U.S. Cl. .......................... 395/290; 395/308; 395/325; 395/309; 395/287; 395/293; 395/296; 395/297
[58] Field of Search ..................................... 395/290, 308, 395/325, 293, 296, 297, 309, 287

[56] References Cited

U.S. PATENT DOCUMENTS

| | | | |
|---|---|---|---|
| 5,247,620 | 9/1993 | Fukuzawa et al. | 395/325 |
| 5,434,983 | 7/1995 | Yaso et al. | 395/325 |
| 5,450,551 | 9/1995 | Amini et al. | 395/299 |
| 5,469,577 | 11/1995 | Eng et al. | 395/290 |
| 5,564,025 | 10/1996 | De Freese et al. | 395/290 |
| 5,596,729 | 1/1997 | Lester et al. | 395/308 |
| 5,740,387 | 4/1998 | Lambrecht et al. | 395/309 |
| 5,761,452 | 6/1998 | Hooks et al. | 395/296 |

*Primary Examiner*—Ayaz R. Sheikh
*Assistant Examiner*—Eric S. Thlang
*Attorney, Agent, or Firm*—Jonathan M. Harris; Michael F. Heim; Conley, Rose & Tayon, P.C.

[57] ABSTRACT

A system management module (SMM) for a host server system includes a system management processor (SMP) connected to a system management local bus. The system management local bus connects to the system PCI bus through a system management central (SMC). The SMC includes the main arbitration unit for the PCI bus and also includes the arbiter for the system management local bus. The SMM includes a video controller and/or keyboard and mouse controller connected to the system management local bus to support remote consoling of the SMM. The SMC includes logic to monitor PCI cycles and to issue error signals in the event of a system error. The SMC also isolates failed components by masking request, grant and interrupt lines for the failed device. Further, if a spare component is provided, the SMC permits dynamic switching to the spare. In addition to detecting errors and performing survival and maintenance operations, the SMC enhances system performance during normal operations by supporting master-target priority determinations to more efficiently arbitrate mastership of system busses such as the PCI bus.

16 Claims, 10 Drawing Sheets

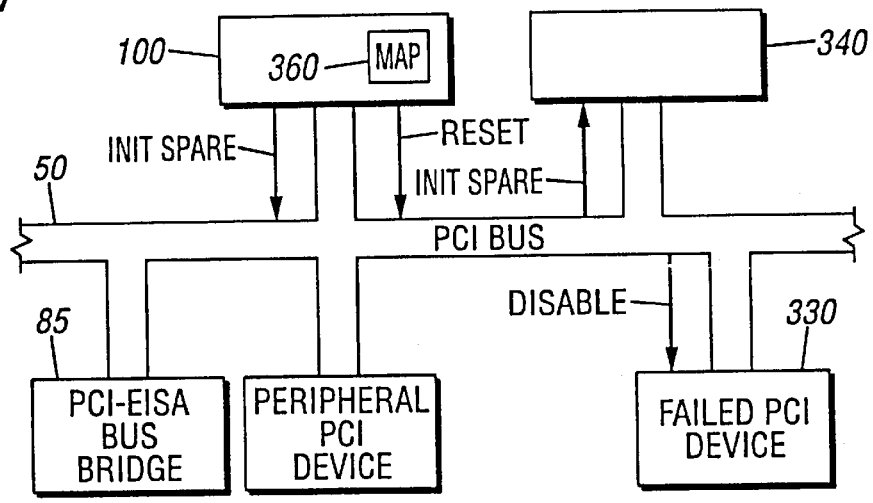
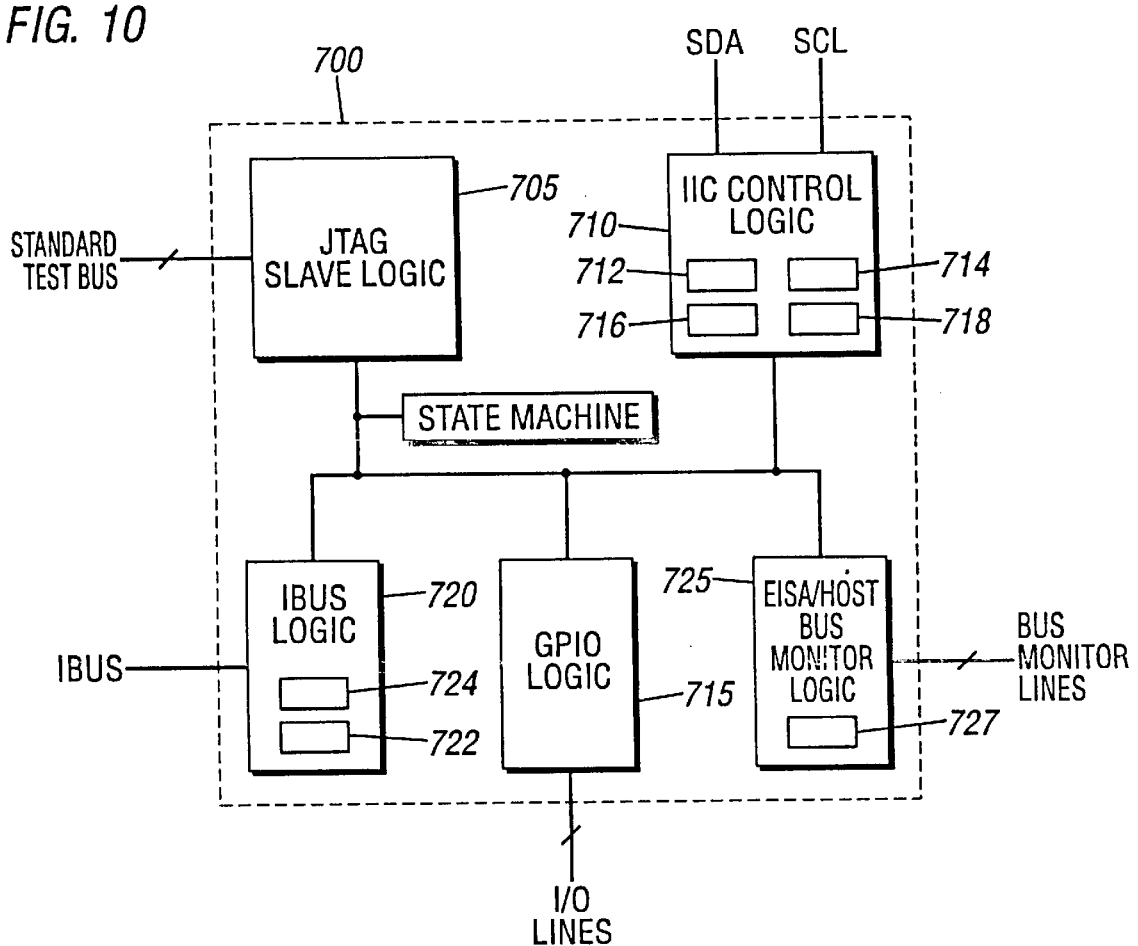

MASTER-TARGET BASED ARBITRATION PRIORITY

BACKGROUND OF THE INVENTION

1. Field of the Invention

The present invention relates generally to a host computer that functions as a server for a distributed computing system. More particularly, the present invention relates to a diagnostic subsystem for the host computer that can be directly or remotely accessed by a system administrator, and which permits the system administrator to enter commands to the host system and to view operation of the host system. Still more particularly, the present invention relates to a diagnostic subsystem for a host server computer that monitors the host server for errors, and in response, takes appropriate action, including alarm generation, error diagnosis, and in some instances, corrective action to restrict or minimize the error condition to permit continued operation of the distributed computing system.

2. Background of the Invention

Distributed computing systems (or computer networks) are generally well known. Such systems permit communications between application programs loaded on numerous computer work stations in a network. There are numerous types of distributed computing systems commonly classified by the geographical extent of their communication capabilities. Some of the terms used to classify the geographical breadth of distributed computing systems are for example local area networks (LAN's), metropolitan area networks (MAN's) and wide area networks (WAN's).

Computer network systems such as LAN's have become one of the most important devices for storing and sharing data in a business. Thus, computer networks are one of the most critical pieces of equipment in a business office. A failure in the computer network can cause business operations to grind to a halt. Computer networks typically comprise a plurality of personal computers and other data processing devices connected together for information exchange. At the heart of the computer network is one or more file servers. In most computer networks, file servers are responsible for administrating and storing the documents generated by each of the personal computers (PC's) in the system. In addition to managing the network, file servers also preferably include the capability to monitor for faults in the computer network. If a fault or security breach is detected, the file server provides a warning of the fault and in certain instances may also provide diagnostic operations and may even implement corrective measures.

Because of the fact that file servers are responsible for storing much of the data generated in the computer network, the file server typically has mass storage capabilities. The mass storage typically is implemented in a disk subsystem or disk array. To preserve the integrity of data stored in the disk array, it is common to provide redundant array of inexpensive disk (RAID) protection, to prevent loss of data in the event of server or network system error. Typically, SCSI hard disks are used to permit multiple hard drives to be chained to a single interface connector.

Network interface controller (NIC) cards commonly are used to couple the server to one or more computer networks. Both the SCSI hard disk and the network interface controller (NIC) connect to slots or connectors in the server system board. A server system board includes connectors for receiving external cards, such as the NIC cards. Other bus expansion slots may also be provided on the server system board, such as EISA (Extended Industrial Standard Architecture) and PCI (Peripheral Component Interconnect) expansion slots for receiving peripheral devices designed for those particular bus standards.

Files or data, are maintained by a host processing system within the server. Servers are designed to provide work stations with fast access to files stored by the server. Accordingly, file servers embody a host computer which responds to an operating system program (a popular operating system being, for example, WINDOWS NT®, or NETWARE®) to not only orchestrate the files but also to maintain file security, file backup, or other file management features. One important aspect which flows from maintaining host functions within a server is the capability to manage the host from a remote site, and to even permit management of the host from sites remote from the network. Recently there has been a steady increase in the number of servers that are used in businesses. Increasingly, servers are placed at each location of a business, rather than using a centralized main frame computer at a single location. Typically, a company has an individual or department responsible for administering all of the file servers. In many if not most instances, the administrator or administration department is physically located at a single site, such as the companies' headquarters. Thus each of the servers must either be maintained and administrated remotely or else personnel must be transported to remote offices to permit on-site management.

An example of a common server host system is illustrated in FIG. 1. As shown generally in FIG. 1, one or more host processors are coupled to a system bus. The host memory couples to the system bus via a memory controller unit. The system bus, in turn, also couples to a PCI bridge which interfaces the system bus to a PCI bus. Various PCI peripherals may reside on the PCI bus. A PCI to EISA bus bridge typically couples the PCI bus to an EISA bus. Various EISA peripherals may couple to the EISA bus. In addition, and as shown in FIG. 1, an APIC bus may couple directly between the host system processor and the PCI to EISA bus bridge. Other peripherals may also couple to the system bus. Network interface cards (NIC's), for connecting the server to the PC's, may couple to either the PCI bus or to the EISA bus.

Many operating systems permit access to the host from a remote site, often call a "virtual terminal." A virtual terminal, while not physically connected to the host, nonetheless allows remote control of certain operations of the host. Products such as Compaq Server Manager® and Compaq Insight Manager®, obtainable from Compaq Computer Corp., have attempted to address some of the issues involved in managing a network of distributed servers from a single, remote site. These products permit an administrator to be notified of a remote server failure, to reset the server from the remote site, and to access certain information provided on the server console. Compaq's Insight Manager® permits remote maintenance of the file server as well as local and remote notification of errors. In addition, Insight Manager® permits the file server to be re-booted from a remote location or from any system on the network. Insight Manager® also provides control facilities including diagnostic capabilities to analyze the condition of the server system configuration and to update system firmware. Insight Manager® collects and monitors server data as well as data from each client in the network and allows the network manager to act on the data from a remote location or any work station on the network. In addition, Insight Manager® includes the capability to set user defined thresholds which permit the server to monitor system parameters and to alert the network manager when an error occurs. Notification in the event of an alert or a failure is delivered in many possible ways including on screen messages, a pager, e-mail, fax and SNMP.

It is certainly beneficial to allow remote control of certain server functions, especially those needed to reset one or more servers within network of servers. Downtime caused by server failure is probably the most costly time involved in running a distributed computer system. The causes of server failure, often termed server host "crash" are numerous. Any number of malfunctions or design flaws associated with the server hardware, server operating system or application program running on a server may account for a server crash. If a server crashes, then file access is often lost and business records are temporarily inaccessible until the cause of failure is fixed.

A true benefit would result if an administrator located remote from the server can do more than be alerted to, and then reset, a failed server. In particular, it would be advantageous for the administrator to determine the cause of server failure so that he/she can possibly prevent future failures before they occur. Prevention of failure is as important, if not more important, than resetting a server that has crashed.

The cause of a failure is generally displayed on the server console at the time in which the server crashes. Moreover, irregularities in the server host hardware or operating system software can be detected upon reset (or "boot"). Those irregularities can lead to future failure if not attended to by the administrator. Accordingly, it would be beneficial to gain access to what is displayed on the server host console not only during server reset (or failure) but also leading up to server reset/failure. Information within the video screens (more particularly the sequence of video screens) displayed on the server console, which occur during server failure or reset would help remotely located administrators determine (and hopefully fix) an existing server failure or potential failure.

The video screens, resulting from a reset or failure of the server, comprise a sequence of video screen changes displayed on the host server console by the operating system, system basic input output system ("BIOS"), server application program or other system software. In particular, capture of two screen change sequences are of particular interest to a server administrator. In order to fix an existing failure or a future failure, it would be beneficial that the administrator be given the sequence of screen changes prior to server failure as well as the sequence of screen changes following a reset. Examples of server failure screens displayed on the server console are Microsoft Corp., Windows NT® "blue screen" and Novell Corp., NETWARE® ABEND message which appear on the server console when the respective operating system crashes. These screens provide information such as processor fault indicia, system software routine addresses, and pertinent system memory contents. Upon reset of the server, the power on self test ("POST") code, associated with the aforementioned operating systems, typically performs some system diagnostic functions and displays information regarding failures detected to the server console screen. It would be desirable to capture such sequences and replay them at a remote management site. It would also be desirable to have a remote console system which would permit diagnostic inquiries to be developed remotely which then could be transmitted to the host server system for execution. Thus, for example, tests can be run to detect open and short circuits in the system, which are the leading causes of failures. The results of these tests would then be relayed at the remote management site.

In addition to remotely monitoring the host server system, it would be advantageous to design a host server which is capable of surviving the majority of system faults. In that vein, it would also be advantageous if failed components could be detected and isolated from further interaction in system operation. It would further be advantageous if failed components in the system could be replaced dynamically with spare components without requiring a system shut down.

In systems with multiple bus masters, it is common to award mastership of the bus based upon priority values assigned to each master. Thus, when two masters request bus mastership at the same time, the master with the higher priority value will be granted mastership. Awarding mastership based only upon the preordained priority value of the bus master may cause the system to operate inefficiently. In addition, awarding mastership in this fashion ignores the type of transaction being executed, and also ignores the relative importance of the targets. It would be advantageous if additional criteria were examined for awarding bus mastership other than simply the relative priority of the masters to enhance system performance.

BRIEF SUMMARY OF THE INVENTION

The problems outlined above are in large part solved by a remote communication system of the present invention. The remote communication system includes a system management module (SMM) which can be included in the server system (such as, for example, by connection to an expansion bus on the server system board). Preferably, the SMM is connected to the PCI bus, although the SMM may be located elsewhere if desired. The SMM includes a system management processor (SMP) and a system management central (SMC) control logic. The SMP and SMC connect to a system management (SM) local bus, which also connects to a VGA controller and a keyboard interface controller. The inclusion of a VGA controller on the SM local bus permits an administrator or other user to remotely monitor video data reflecting the operation of the SMM. Similarly, the inclusion of the keyboard interface on the SM local bus permits the system administrator or other user to directly access the components on the SMM (such as the SMP and SMC) by generating commands remotely for these components. The implementation of the VGA controller and the keyboard interface as part of the SMM thus permits an administrator to gather information stored by the SMM and to command the SMM to perform certain operations. In addition, the inclusion of these components in the SMM permits a user to access the server in a virtual terminal mode from a remote location.

The SMC of the present invention preferably includes a bus arbitration and monitor unit that preferably operates as the main arbitration unit for the PCI bus. Thus, all requests for mastership of the PCI bus pass through the SMM. The bus arbitration and monitor logic receives bus mastership requests from the various bus masters in the system and grants mastership based upon certain criteria. In addition, the arbitration and monitor logic monitors the activities of the bus master to determine if the bus master responds adequately to mastership grants. In the absence of a proper response, the arbitration and monitor logic will again attempt to grant bus mastership to the designated bus master. If the master does not perform successfully within a certain number of retries, the bus arbitration and monitor logic isolates that master from the system by masking the request/ grant line to the arbitration unit and masking the interrupt lines to the system processor for that master. Thus, the defunct master cannot be granted mastership of the bus, and cannot transmit interrupts to the host system. The master therefore is effectively removed from the system until the master is repaired, or until the system is reset.

The SMC of the present invention also includes an IEEE 1149.1 compatible bus controller. This controller is used to run Boundary Scan tests on the host system. The SMP controls the SMC bus controller.

The SMM of the present invention also includes the capability to reconfigure memory and input/output space for dynamically switching to spare components without shutting down the system. If a spare is provided for a system component, the SMM dynamically reconfigures memory and I/O space in the event that the primary system component fails so that the spare assumes the address of the failed system component. In addition, the SMM functions to copy data from the failed component to the spare. During the configuration and switching, the SMM locks the appropriate bus (such as the PCI bus) to prevent any traffic on the bus until the spare has been switched.

The main arbitration logic in the SMC preferably grants bus mastership based upon the Master-Target combination. Thus, certain cycles are given priority when awarding bus mastership. The arbitration and monitor logic keeps track of the identity of the current bus master. In addition, the arbitration and monitor logic may be programmed to award priority based upon certain master-target combinations. Thus, the SMC arbitration unit receives bus mastership requests, and also monitors for the address of the intended target. Mastership grants are determined by both the source of the request and the intended target of the cycle.

The SMM of the present invention preferably includes system management remote (SMR) units which function to monitor conditions in the host system. The SMR units couple to the SMC via an IEEE 1149.1 standard test access bus, and one or more special serial interrupt busses. The SMC and SMR units transmit signals over a serial interrupt bus (either the Granite interrupt bus (GIBUS) and/or the inter-chip interrupt bus (ICIB)) using time division multiplexing. In the event that the SMC cannot identify the source of an interrupt, the IEEE 1149.1 standard test access bus may be used to identify the source by communicating with the SMR's in the system. The SMC includes interrupt routing logic to mask certain interrupts in the event of a system failure.

These and other advantages of the present invention will be apparent to one skilled in the art upon reading the following detail description of the invention.

BRIEF DESCRIPTION OF THE DRAWINGS

A better understanding of the present invention can be obtained when the following detailed description of the preferred embodiment is considered in conjunction with the following drawings, in which:

FIG. 7 is a block diagram showing in more detail the manner in which the SMM performs dynamic switching;

FIG. 10 is a block diagram depicting the preferred configuration of the system management remote (SMR) units of FIG. 2;

DETAILED DESCRIPTION OF THE INVENTION

Figure 1:
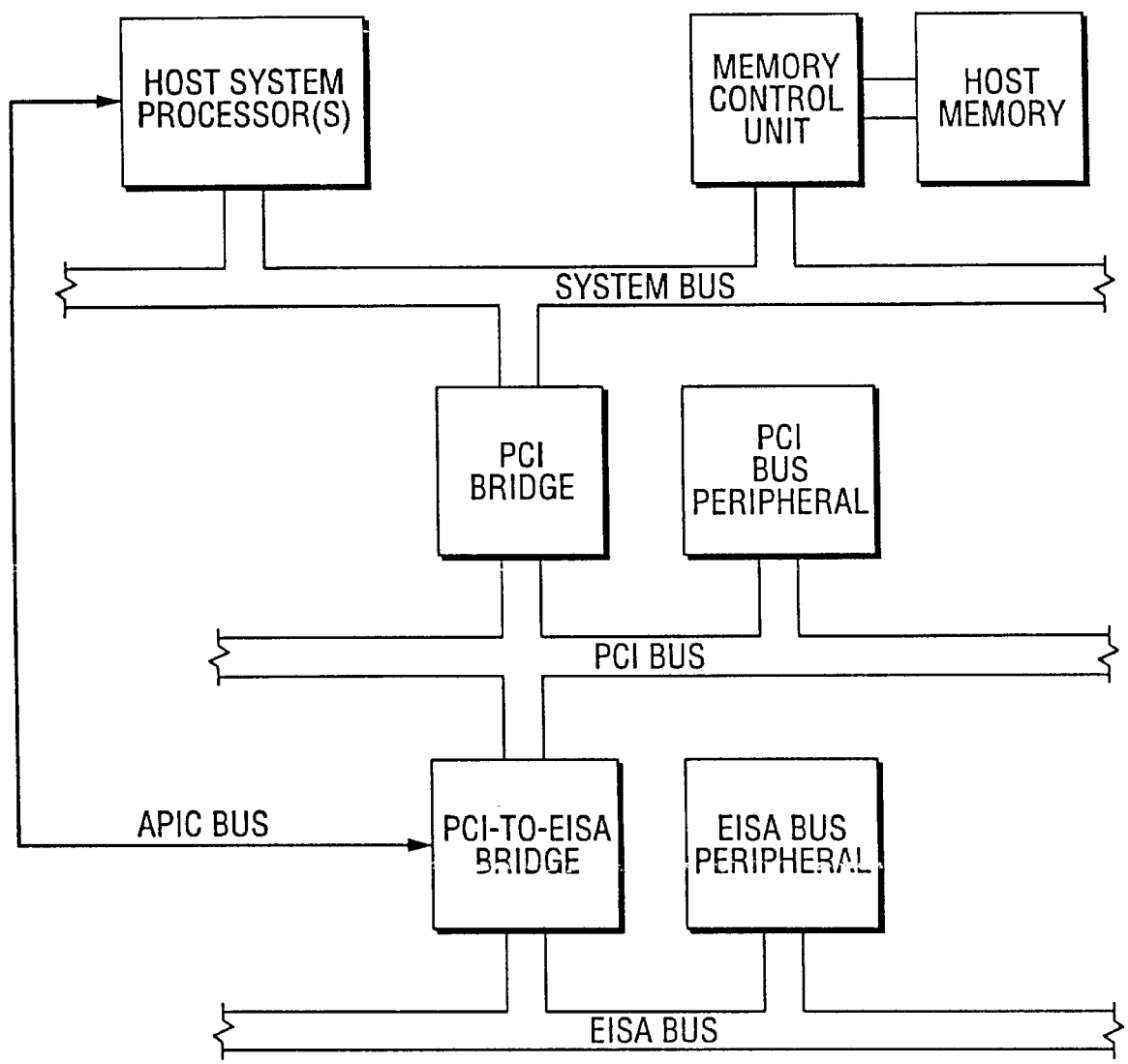
FIG. 1 is a simplified block diagram of a prior art host server system.
Figure 2:
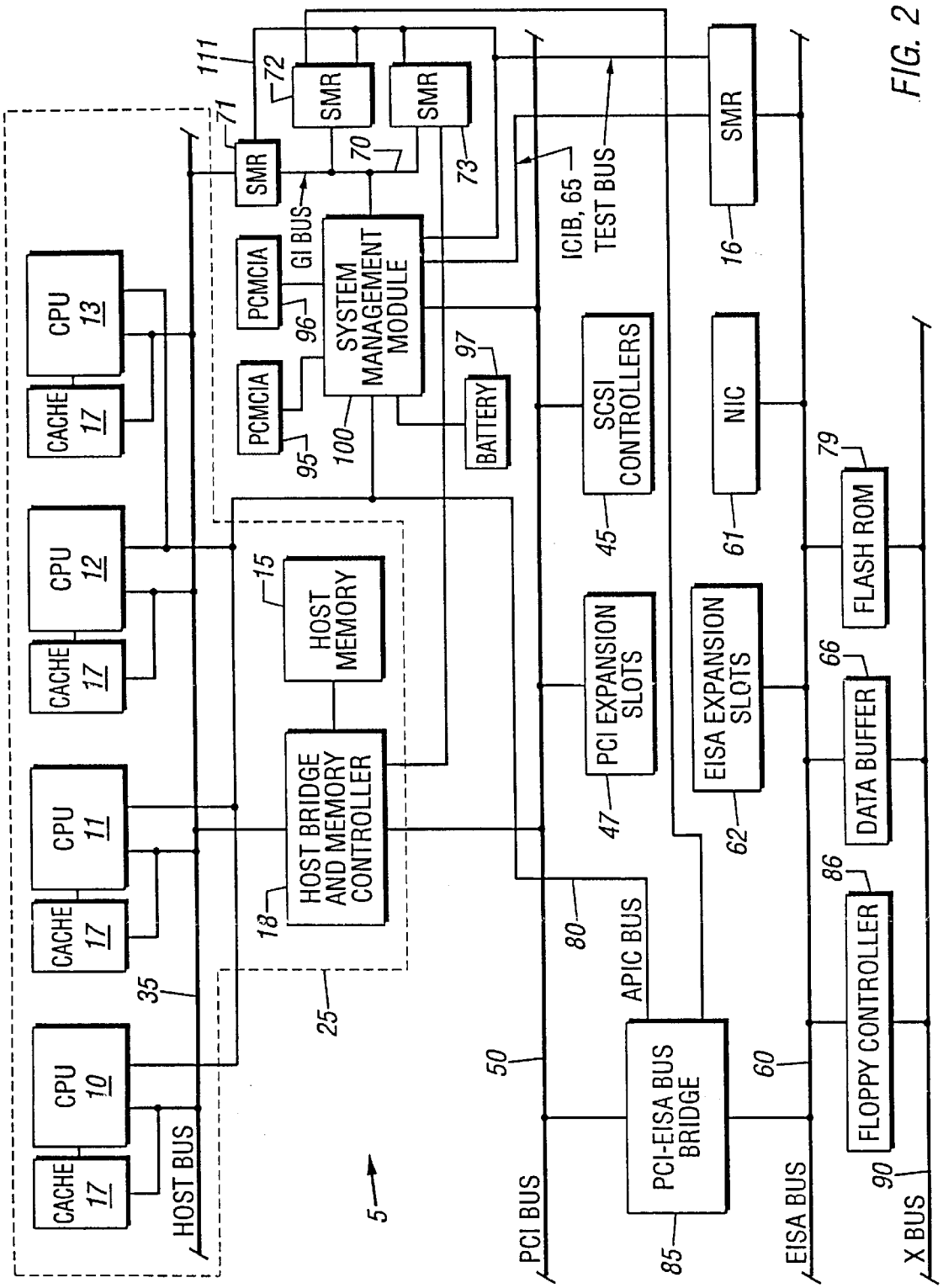
FIG. 2 is a block diagram illustrating a host server system constructed in accordance with the preferred embodiment.

Referring now to FIG. 2, a block diagram of an exemplary computer system 5 is shown. The computer system 5 encompasses any system which stores and retrieves files, including a file server, an application server, or any other server used in a distributed computing system. The computer system 5 preferably includes a host subsystem 25 which comprises a host central processing unit (CPU) 10 coupled to other components in the host subsystem 25 via a CPU local bus (or host bus) 35. The CPU 10 includes any data processing unit which implements a predetermined instruction set and has basic computing features such as execution units, control/timing units and registers. Exemplary CPU's include the Pentium® and Pentium Pro® processors manufactured by Intel Corp. As shown in FIG. 2, multiple CPU's 11, 12, 13 may be provided to enhance the processing capabilities of the system 5.

Various peripheral devices couple to the host CPU and the host bus by connection to one of a number of system peripheral busses. In accordance with one embodiment of the present invention, the bus architecture of the computer system preferably includes a 32-bit PCI (peripheral component interconnect) bus 50 and 32-bit EISA (extended industrial standard architecture) bus 60. Alternatively, the bus 60 can comprise an ISA (industry standard architecture) bus, or any other bus architecture capable of interconnecting components in a computer system. In addition, while the bus 60 is shown coupled to the PCI bus, one skilled in the art will recognize that other system configurations may be used to interface the various busses that are implemented in the system.

The host subsystem 25 preferably couples to the PCI bus 50. The host processor subsystem 25 includes a processor-PCI bridge 18 that connects between the PCI bus 50 and the host bus 35 to convert processor cycles to PCI cycles and vice versa to facilitate data transfers between the host bus 35 and the PCI bus 50. In the preferred embodiment, the processor-PCI bridge 18 also includes a memory controller for controlling operations to host memory 15. The memory controller 18 orchestrates the transfer of data between the host bus 35 and host memory 15. The memory controller 18 responds to various addressing techniques, and preferably is configured to support various storage cell architectures within system memory 15, including various dynamic random access memory (DRAM) implementations and static random access memory (SRAM) configurations. The processor-PCI bridge 18 is preferably implemented with an application specific integrated circuit (ASIC), but alternatively can be implemented with the 82434LX PCI/Cache/

Memory Controller (PCMC) from Intel Corp®. Each of the CPU's in the host subsystem 25 preferably connect to an external cache 17. Control of the external caches 17 is provided by the processor-PCI bridge 18 or by logic in the cache 17.

Various peripheral devices may connect to the PCI bus 50, as will be understood by one skilled in the art. For example, server systems preferably include a SCSI hard disk controller 45 connected to the PCI bus 50 to control operations of various SCSI devices through a connector (not shown). The various devices include hard disk drives and CD-ROM drives. Other expansion slots 47 may be provided for coupling other peripheral devices to the PCI bus 50.

In the preferred embodiment, a system management module (SMM) 100 preferably also connects to the PCI bus 50. The SMM 100 may be provided integrally with the computer system 5 on a system board, or may be provided as a plug-in board for connecting to the PCI bus 50 in accordance with known techniques. The SMM 100 detects failures in the computer system 5 and preferably includes the capability to correct some of those failures. As to the failures that cannot be corrected, the SMM 100 preferably is capable of isolating the source of the failure to enable the computer system to continue operation, with limited capabilities. In response to an error or failure, the SMM 100 preferably transmits an error signal to a systems administrator to initiate error analysis followed in some instances by a system reset. In accordance with the preferred embodiment, the error analysis and reset are performed remotely.

The system management module 100 may monitor various electrical and mechanical parameters in the system to detect system errors. Thus, for example, the SMM 100 monitors for noise in the power supply circuit, as well as for noise in other components in the computer system, determines if open and shorted connections exist in the computer system, checks for failure in the various memory devices, and detects failures in the CPU, bus bridges, hard disk controller, hard disk drives, and network interface cards (NIC's). The system management module 100 also monitors the environmental conditions of the computer system 5, such as temperature and fan operation.

Referring still to FIG. 2, the SMM 100 preferably couples to one or more PCMCIA connectors 95, 96 to permit the SMM 100 to communicate to other components on the network (via a NIC card) or to remote locations (via a modem). The SMM 100 also preferably includes its own power source 97 in the event of a power failure to the system. Thus, power source 97 preferably comprises a battery back-up, or other uninterruptible power supply. The SMM 100 couples to various System Management Remote monitoring units (SMR's) 71, 72, 73 in the system preferably via the IEEE 1149.1 standard test bus, and a bi-directional Granite interrupt serial bus (GI Bus) 70. In addition, the SMM 100 couples via a high speed bi-directional serial inter-chip interrupt (ICIB) bus 65 to an EISA system management remote (EISA SMR) unit 76. The SMM 100 also may connect to other buses in the system, including the APIC bus 80 and IEEE 1149.1 standard test bus 81. As one skilled in the art will appreciate, connections to some of these buses may be omitted. Conversely, in the event other buses are available in the system, the SMM 100 may connect to these buses and may transmit signals over these buses to facilitate system diagnosis and error detection.

Preferably connected between the PCI bus 50 and the EISA bus 60 is a PCI-EISA bus bridge 85. The PCI-EISA bus bridge 85 preferably comprises an Intel 82375SB PCI-EISA Bridge that controls the transfer of data and address signals between the PCI bus 50 and the EISA bus 60. In accordance with normal convention, the computer system 5 includes slots 62 on the EISA bus 60 for receiving expansion boards. In one embodiment, a network interface card (NIC) 61 connects to the EISA bus 60 for controlling communications with an external local area network (not shown specifically). A data buffer 66 also connects to the data portion of the EISA bus 60 to provide an additional data bus (the X bus 90) for various components. A system flash ROM 79 receives its control and address signals from the EISA bus 60 and connects to the data portion of the X bus 90 for data transfers. Preferably, the system flash ROM 79 contains the BIOS information for the computer system 5. A floppy controller 86 also connects to the data portion of the X bus 90 for performing data transfers between a floppy disk drive (not shown) and other components in the computer system 5. In the preferred embodiment, a system management remote (SMR) unit 76 couples to the EISA bus 60 for monitoring conditions on the EISA bus 60 and transmitting signals to the SMM 100. As will be described in more detail, the SMR unit 76 monitors the operation of the EISA bus 60 and transmits a signal to the SMM in the event of an error condition on the EISA bus 60. SMR 76 also preferably relays interrupt signals appearing on the EISA bus 60 to the SMM 100. SMR units 71, 72 and 73 connect to various system logic and busses to provide monitoring functions and data relay to the SMC. Preferably, this logic includes the host-to-PCI bridge and the PCI-to-EISA bridge, and the host bus. Thus, as shown in FIG. 2, SMR 71 couples to the host bus 35 to monitor operations on that bus. SMR 72 connects electrically to the PCI-EISA bus bridge 85 for monitoring operation of the bus bridge. Similarly, SMR 73 connects to the host bridge 18 for monitoring the operation of the host bridge. In the event of an error on the bus or bridge being monitored, the SMR unit transmits a signal to the system management module 100 via the bi-directional (GI or ICIB) bus.

Figure 3:
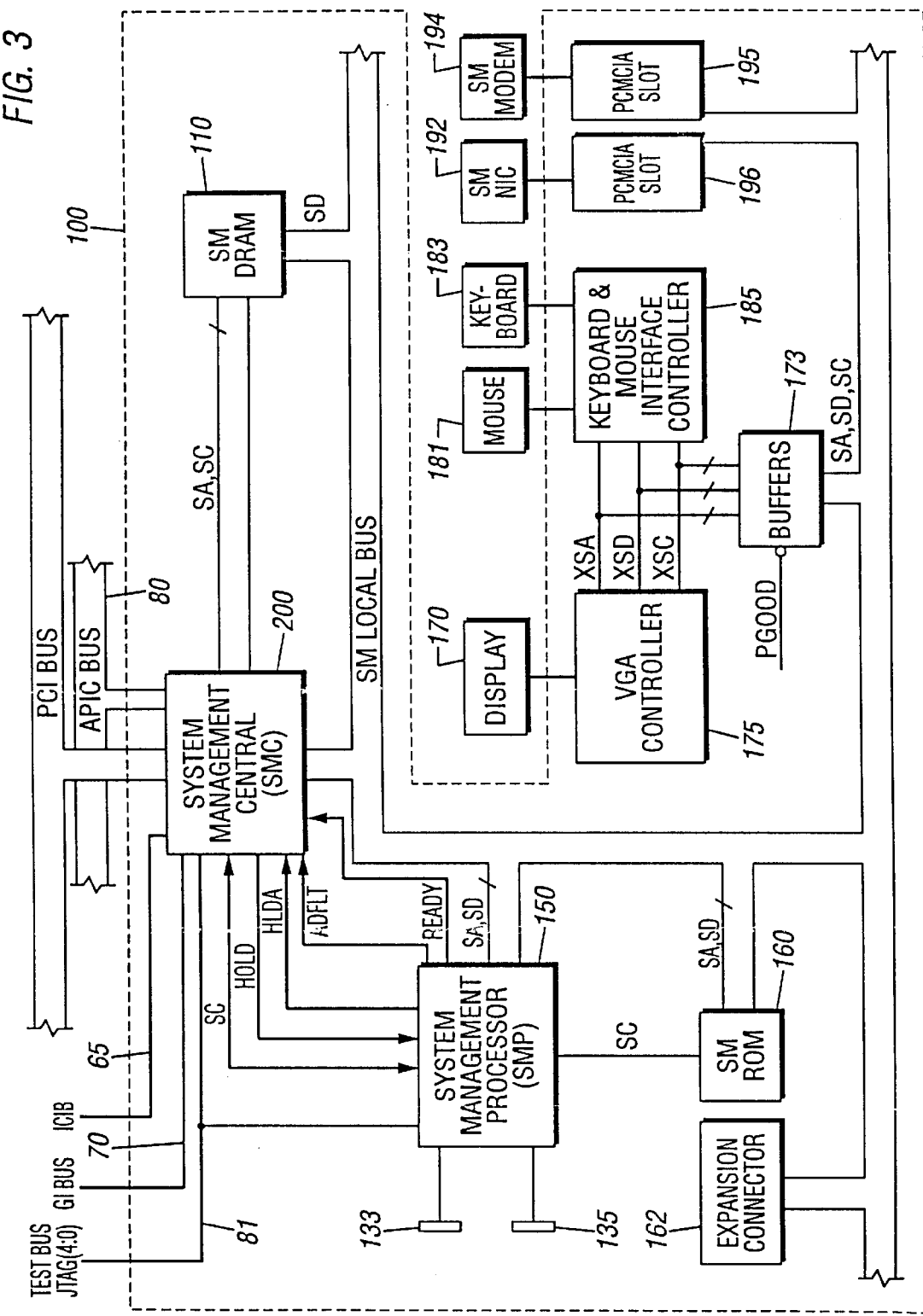
FIG. 3 is a block diagram depicting the configuration of the system management module (SMM) of FIG. 2.

Referring now to FIG. 3, the system management module 100 preferably includes a system management processor (SMP) 150, which preferably is implemented with the Intel 386EX processor. One skilled in the art will understand that other processors may also be used as the SMP 150. The SMP 150 preferably provides additional intelligence to the host system 5 focused primarily upon error detection and system administration to reduce the load on the host CPU 10. In addition, according to the preferred embodiment, the SMP 150 also preferably functions as a "survival" processor in the event the host CPU 10 "hangs" or is rendered inoperable by system error. The SMP 150 thus permits access to the host computer system 5 for purposes of accessing system components to determine the source of the error. The SMP 150 also preferably detects other system errors and isolates the source of the errors to permit the host computer system 5 to continue operations.

The SMP 150 preferably operates at a frequency of at least 25 MHz with a supply voltage of 5 volts. As one skilled in the art will understand, however, other clock frequencies and power supply requirements may be used depending upon the processor selected as the SMP. The SMP 150 preferably couples to a 16-bit local SM bus 75, which preferably is based primarily upon the protocol of the ISA (Industry Standard Architecture) bus. In accordance with the preferred embodiment, bi-directional tri-state buffers (not specifically shown) are placed between the processor address and data signals and the address and data signals SA and SD of the SM bus 75. These buffers also are placed on the IEEE 1149.1 bus and may also be placed on the IIC bus, or any other bus which connects logic (including battery-backed logic and other system logic). The tri-state buffers preferably are implemented with high speed bus CMOS switches such as the QST 3384 or 3584 from Quality Semiconductor Inc., although other high speed bus switches could be used. In the preferred embodiment, the tri-state buffers are embedded in the SMP 150 to reduce cost and board space requirements. In the embedded embodiment, the tri-state buffers can either be a second stage of buffers or can comprise the existing tri-state buffers used during hold operations. The control signals of the SMP 150 connect directly to a system management central (SMC) ASIC 200. A serial port 133 and a parallel port 135 preferably connect directly to the SMP 150, which preferably includes integrated controllers for controlling communications with the serial and parallel ports.

The system management processor 150 preferably has the same privileges as the host CPU 10. Thus, the SMP 150 can reboot the system 5 without accessing the host CPU 10. In the event that the SMP is removed from the PCI bus 50 or the PCI bus fails, the SMP 150 can still operate and communicate with the VGA controller 175, the keyboard controller 185, the SMM NIC 192 and the SMM modem 194. In the preferred embodiment, the system management module 100 preferably isolates and utilizes separate input, output and memory maps and interrupts. The SMC 200 functions as a switch box for interrupt routing and interfacing the various busses. The SMC 200 routes keyboard and mouse interrupts individually to the system management processor 150 and to the host CPU 10.

Also connected to the SM bus 75 is a pair of PCMCIA slots 195, 196 for connection to PCMCIA cards, such as a network interface card (NIC) 192 or a modem 194. The inclusion of the NIC 192 on the SM local bus 75 permits the SMP 150 to perform accesses to the distributed network system even if the computer system 5 becomes inoperable. As a result, if a failure occurs in the host CPU 10, the NIC controller 61, PCI bus 50, and/or EISA bus 60, the SMM 100 still may perform accesses to the network system through a SM NIC 192 connected to slot 196 on the SM local bus 75. Similarly, the SMP 150 may send messages to a remote location via the SM modem 194, which connects to slot 195 on the SM local bus 75. Thus, the SMP 150 is capable of sending remote signals in the event that the computer system 5 crashes.

The SMM 100 also includes random access memory 110 preferably in the form of dynamic random access memory (DRAM). Other types of memory circuits also may be used such as static random access memory (SRAM) circuits, if desired. The local memory 110 preferably has a storage capacity of at least 2 Mbytes, with expansion capabilities to at least 4 Mbytes. The SM DRAM 110 is used to store data and code for execution by the SMP 150.

A local system management electrically erasable programmable read only memory (SM ROM) 160 preferably connects to the SMP 150 via control lines SC and connects to the SM local bus 75 to transmit address (SA) and data (SD) signals when prompted by the SMP 150. The local ROM 160 preferably stores power-on self-test (POST) code for the system management module 100 as well as for the rest of the computer system. The SM ROM 160 also preferably stores test vectors for running an IEEE 1149.1 boundary scan test on the host system. The SMC contains an IEEE 1149.1 compatible bus controller for executing this test.

The SM ROM 160 preferably has a storage capacity of 4 Mbytes. The basic input/output system (BIOS) for the SMM 100 also preferably is stored in the system management ROM 160. The SM BIOS assumes a 4 megabyte system management DRAM 110. During initialization of the SMM 100, the SM ROM 160 writes certain patterns to the SM DRAM 110, and performs reads and compares data to determine the actual size of the system management DRAM 110. The memory mapped devices on the system management module 110 include a video controller 175, system management DRAM 110, flash ROM 160, and PCMCIA devices 192, 194. Video space size and addresses preferably are fixed, but system management DRAM 110, system management ROM 160, and PCMCIA sizes and addresses are programmable in SMC configuration registers. In addition, programmable page registers preferably are included in the SMC 200 to allow the SMP 150 to access the host memory 15 and the host I/O space. In an exemplary embodiment, each PCMCIA slot 195, 196 can be mapped into one of five memory address ranges above 64k and below 16 megabytes, starting at any 4k boundary. The SMC 200 preferably broadcasts SMP 150 memory cycles which have an address outside of the programmable address regions to the PCI bus 50. The system management power on self test (POST) program enables the default broadcast feature after determining the SM DRAM 110 size by setting an appropriate PCI definition register. Table I represents exemplary default addresses for various devices in the system management memory space:

TABLE I

| Device | Legend | Size | Address Space |
|---|---|---|---|
| System Management Flash EEPROM | SM_ROM | 8 MB | 380_0000H–3FF_FFFFh |
| PCMCIA Socket A Mem Region 0 | MMR_A0 | Variable | <+0FF_FFFFh |
| PCMCIA Socket A Mem Region 1 | MMR_A1 | Variable | <+0FF_FFFFh |
| PCMCIA Socket A Mem Region 2 | MMR_A2 | Variable | <+0FF_FFFFh |
| PCMCIA Socket A Mem Region 3 | MMR_A3 | Variable | <+0FF_FFFFh |
| PCMCIA Socket A Mem Region 4 | MMR_A4 | Variable | <+0FF_FFFFh |
| PCMCIA Socket B Mem Region 0 | MMR_B0 | Variable | <+0FF_FFFFh |
| PCMCIA Socket B Mem Region 1 | MMR_B1 | Variable | <+0FF_FFFFh |
| PCMCIA Socket B Mem Region 2 | MMR_B2 | Variable | <+0FF_FFFFh |
| PCMCIA Socket B Mem Region 3 | MMR_B3 | Variable | <+0FF_FFFFh |
| PCMCIA Socket B Mem Region 4 | MMR_B4 | Variable | <+0FF_FFFFh |
| System Management Memory | SM_RAM | 1 MB | 010_0000h–01F_FFFFh |
| System Management ROM Shadow | SM_ROM | 75 KB | 00E_0000h–00F_FFFFh |
| (Can be PCMCIA Mem) | | 75 KB | 00C_0000h–00D_FFFFh |
| System Management Video | SM_Video | 75 KB | 00A_0000h–00B_FFFFh |
| System Management Base Memory | SM_RAM | 640 KB | 000_0000h–009_FFFFh |

Also coupled to the SM bus 75 is a video controller 175 and a keyboard and mouse interface controller 185. The video controller 175 and keyboard and mouse controller 185 preferably connect through bi-directional tri-state buffers 173 to the SM bus 75. The address, data, and control portions that connect to the video controller 175 and keyboard and mouse controller 185 are shown in FIG. 3 as signal lines XSA, XSD and XSC. The SM local bus 75 connects to buffers 173 via address, data and control lines SA, SD and SC. The enable input of the tri-state buffers 173 connects to the inverted state of a power good signal (PGOOD), which preferably may be asserted by either the system power supply (not shown), or the battery back-up 97 (FIG. 2). The tri-state buffers 173 preferably are provided between the video controller 175 and the SM bus 75 to match the propagation delays associated with the address and data signals driven by the SMP 150 due to the tri-state buffers embedded in the SMP 150.

The keyboard/mouse interface controller 185 preferably couples to the system management local bus 75 to provide encoded input signals from the user to the various devices in the system management module 100. In similar fashion, the VGA controller 175 couples to the system management local bus 75 and to a display unit 170 where SMM and host system operations may be displayed to a local user. The keyboard controller permits the SMM 100 to simulate a keyboard, monitor accesses by the host, and take control of the keyboard from the host in appropriate circumstances. Simulation of the keyboard is performed by stuffing key scan codes into the keyboard controller 185 by the SMM 100. In the preferred embodiment, the keyboard controller 185 comprises an Intel part #8042. During keyboard simulation, the host system preferably is locked out of accessing the keyboard controller 185 through the assertion of a ForceRetry signal to the SMC 200 by the SMP 150. In response, the SMC 200 denies other PCI masters access to the SM local bus 75.

The inclusion of the keyboard controller as part of the SMM 100 permits the system management processor 150 to view the input signals generated to the host system. To fully monitor keyboard operation, the SMC 200 preferably receives interrupts from the keyboard, and monitors read and write cycles involving the keyboard and mouse controller 185. In the preferred embodiment, the system management processor (SMP) 150 receives the interrupt requests from the keyboard controller 185 for all operations of the keyboard and mouse. In addition, an interrupt is generated for the SMP 150 during writes to the keyboard controller 185. To allow the SMP 150 to view the data passing to the host system, the SMC 200 preferably maintains shadow registers of the keyboard controller 185. The status of the shadow registers is maintained during host operation. Examples of the shadow registers are listed in Table II:

TABLE II

| Address:bits | Function | Sub-function |
|---|---|---|
| xx60:7–0 | (ro) Shadow of 8042 60h when read by host | Read clears the valid and over-run bits |
| xx61:7–0 | (ro) Shadow of 8042 60h when written by host | Read clears the valid and over-run bits |
| xx62:7–0 | (ro) Shadow of 8042 64h when read by host | Read clears the valid and over-run bits |
| xx63:7–0 | (ro) Shadow of 8042 64h when written by host | Read clears the valid and over-run bits |
| xx64:0 (ro) | (ro) Shadow status:8042 60h read valid | 1=register valid (accessed by host) |
| xx64:1 | (ro) Shadow status:8042 60h write valid Read also clears SMP interrupt for write | 1=register valid (accessed by host) |
| xx64:2 | (ro) Shadow status:8042 64h read valid | 1=register valid (accessed by host) |
| xx64:3 | (ro) Shadow status:8042 64h write valid Read also clears SMP interrupt for write | 1=register valid (accessed by host) |
| xx64:4 | Shadow status:8042 60h read over-run | 1=more than one host access since last read |
| xx64:5 | Shadow status:8042 60h write over-run | 1=more than one bost access since last read |
| xx64:6 | Shadow status:8042 64h read over-run | 1=more than one host access since last read |
| xx64:7 | Shadow status:8042 64h write over-run | 1=more than one host access since last read |

The assertion of one of the interrupt lines by either the mouse or keyboard for more than 500 milliseconds without a status read of the 8042 controller by the host is interpreted by the SMC 200 as a host lock up requiring the SMP 150 to take over control of the keyboard. The SMC 200 preferably includes a counter to measure the time between the assertion of an interrupt and a status read of the 8042 controller. When the SMP takes over operation of the keyboard, the SMC blocks keyboard interrupts from being delivered to the host system. Once the keyboard interrupts are blocked to the host system, the system management processor 150 can access the keyboard controller 185 without host intervention.

For the VGA remote console support, the SMP 150 preferably reads the state of the video controller 175 at regular intervals for the purpose of duplicating the video controller state. One problem which may occur is in reading the state of the VGA controller 175 when the host CPU 10 is making an access to the video controller 175. Simultaneous accesses to the video controller 175 by the SMP 150 and the host CPU 10 presents a problem for the input/output registers used for remote switch cursor control and the like. To ensure safe accesses to the VGA registers which form part of the video controller 175, a lock signal is asserted by the SMP 150 to prevent the host from accessing the video controller 175 during accesses by the SMP. The signal is referred to as the SMC_SLAVE_LOCK. The SMC 200 executes lock cycles on the PCI bus by running the PCI LOCK signal until the SMP 150 executes a no lock cycle.

Referring still to FIG. 3, the video controller 175 preferably is representative of commonly used video controllers, such as video graphics array (VGA) controllers. The video controller 175 has associated with it a video memory for storing pixel values to be displayed on display 170. The inclusion of the video controller 175 and keyboard and mouse controller 185 on the SM local bus 75 enables the SMM 100 to function in a remote terminal mode in which a remote user can access and/or control operation of the SMM 100. The remote user may reside on the network and connect to the SMM 100 through the SM NIC 192, or may couple to the SMM through the SM modem 194 from a location removed from the network. Thus, the remote user may generate, for example, keyboard and/or mouse signals that are routed to the SM local bus 75 via SM NIC 192 or SM modem 194. The keyboard and mouse controller 185 receives the signals and encodes those signals for processing by the SMP 150. Similarly, video signals generated by the SMP (and if desired the host CPU 10) are provided to the VGA controller 175 via the SM local bus 75. The VGA controller 175 processes the signals into a pixel format for displaying on a display unit, such as display 170. In addition, the pixel signals may be transferred to a remote location via the SM NIC 192 and/or SM modem 194 for viewing at a remote location using techniques known in the art. In particular, the SMP 150 may cause pixel data to be written from video memory to the remote terminal via either the SM NIC 192 or the SM modem 194 while the host system is locked from accessing the system management local bus 75. As a possible alternative, and assuming that the remote terminal may assert mastership of the SM local bus 75, the remote terminal may perform read cycles to the video controller 175 to read the pixel data stored in the video memory.

Thus, in accordance with the preferred embodiment, remote consoling support can be performed through the use of the VGA controller 175 and keyboard controller 185, even in the event of a crash by the host CPU, a PCI bus hang, and/or a loss of power. The VGA controller 175 and keyboard controller 185 preferably provide remote console support of both the SMM 100 and the host system generally, based upon signals appearing on either the PCI or the system management local bus.

The system management local bus 75 preferably comprises an ISA style bus which is modified to permit the SMM 100 to match VGA timing. Because the VGA controller 175 is located on the SM local bus 75, the SMP 150 also can perform write cycles to the video controller 175 for screen save programs to cut down on PCI traffic and minimize use of the host CPU 10, thereby enhancing system performance. In the preferred embodiment, the SMM 100 has bus mastership capabilities on the PCI bus 50, thus permitting the SMM 100 to run diagnostic operations on the PCI bus 50 and thus, to the rest of the system. In addition, because of the inclusion of the video controller 150 and keyboard and mouse controller 185 as part of the SMM 100, commands for the SMM diagnostic operations may originate from a remote terminal.

As will be apparent to one skilled in the art and as shown in FIG. 3, a display unit 170 may be connected to the VGA controller 175 for locally viewing operation of the SMM 100 and other operations of system 5. The display 170 may include any console or monitor capable of receiving video data, such as a cathode ray tube (CRT), liquid crystal display (LCD), thin film transistor (TFT), or any other suitable computer display. Similarly, a keyboard 183 and mouse 181 may couple to the keyboard and mouse controller 185 for providing input signals from a local administrator to the SMM 100, and to the computer system 5, generally. Additional input and output devices may also be coupled to an expansion bus (such as the EISA bus 60) if desired.

In the preferred embodiment, and referring still to FIG. 3, the SMM 100 or some other server system 5 component saves sequences of video screens changes and other system information just prior to server failure and just after server reset. In the preferred embodiment, this information is saved in memory resources provided in the SMM 100, such as SMC registers, the system management DRAM 110, and/or the System Management ROM 160. In the event of a system failure, data stored in the system management memory devices may be written by the SMP 150 to the remote terminal, or may be accessed by a local administrator. Preferably, the remote terminal that couples to the SMM 100 either by modem 194 or NIC 192 includes a display apparatus and an input device. As will be understood by one skilled in the art, the remote terminal that performs the accesses to the SMM 100 may be loaded with software for facilitating the remote access. Suitable software includes COMPAQ Insight Manager (CIM).

Referring still to FIG. 3, an expansion connector 162 may be provided on the SM local bus 75 to permit additional peripheral devices to be connected to the SMM 100. The connector 162 also may be used to connect a diagnostic unit directly to the SM local bus 75.

Figure 4:
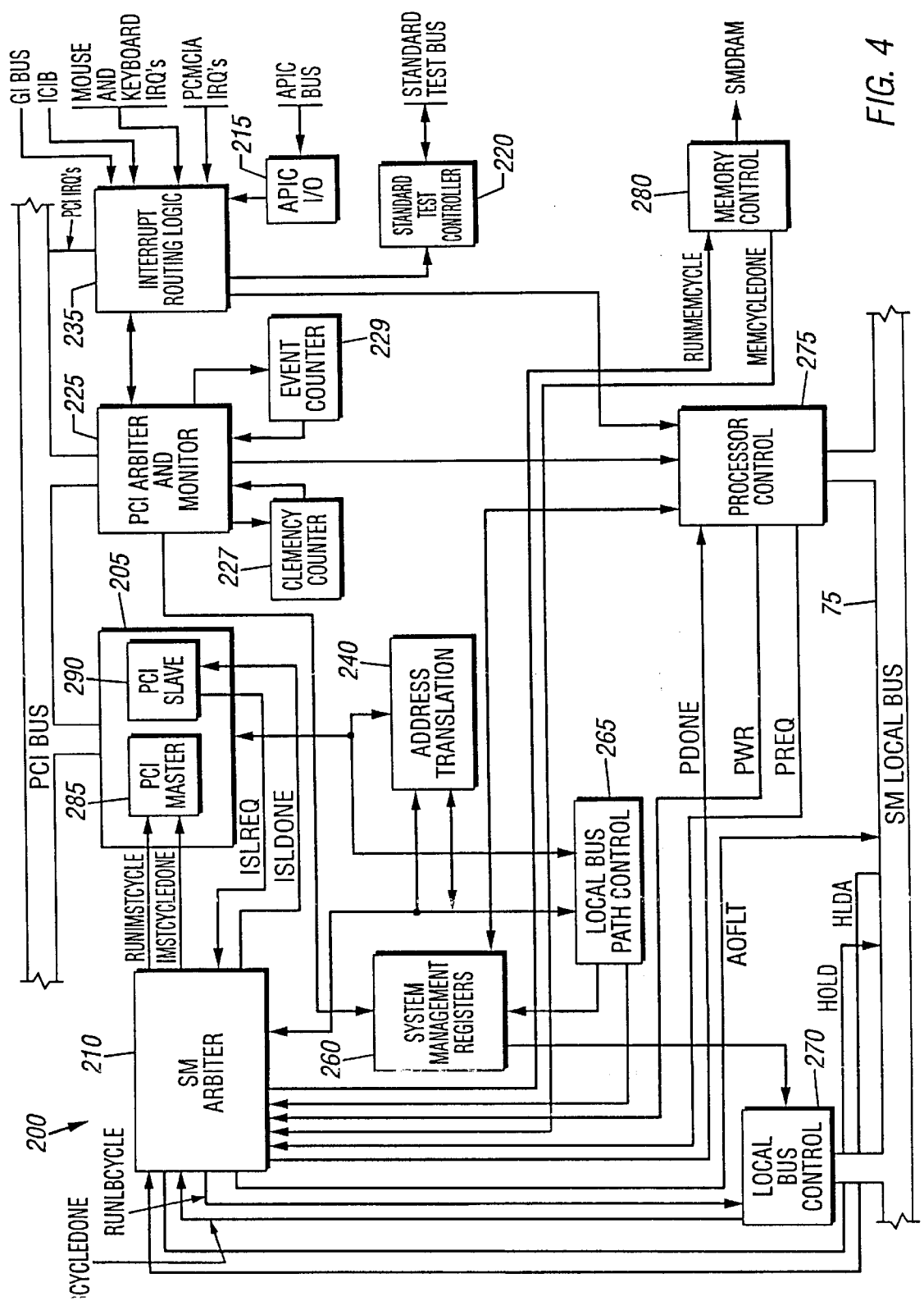
FIG. 4 is a block diagram depicting the configuration of the system management central (SMC) of FIG. 3.

Referring now to FIGS. 3 and 4, the system management central (SMC) 200 couples to the SM local bus 75 and to the PCI bus 50. In addition, the SMC 200 also connects to various other busses that may be present in the computer system 5, including an IEEE 1149.1 standard test bus (JTAG) 81, a grant and interrupt bus (GI Bus) 70, an ICIB bus 65, and an APIC bus 80. As shown in FIG. 2, the SMC 200 couples via these various busses to system management remote (SMR) devices 71, 72, 73, 76 to monitor system operations and to detect system faults. The SMC 200 preferably is constructed as an application specific integrated circuit (ASIC). The SMC 200 provides a mechanism for converting SMP I/O to PCI configuration cycles. A second SMC may be provided on a secondary PCI bus to provide I/O APIC, PCI bus termination, and PCI arbiter capabilities to support the PCI to PCI bridge and additional PCI masters.

As best seen in FIG. 4, the SMC 200 preferably includes a PCI interface 205, a PCI arbiter and logic monitor 225, interrupt routing logic 235, address translation logic 240, system management registers 260, a local bus controller 270, a system management processor controller 275, and SM memory controller 280. In addition to monitoring the status of the system management remote (SMR) devices, the SMC 200 operates as a bridge between the PCI bus 50 and the system management local bus 75. The SMC (via the SM local bus controller 270) preferably tailors the cycle speed based upon the addressed peripheral on the system management local bus 75.

Referring still to FIG. 4, the PCI interface 205 preferably includes PCI master logic 285 and PCI slave logic 290. Transaction cycles to the system management module 100 that are made on the PCI bus 50 are processed through PCI slave logic 290. Transaction cycles originating from the system management module 100 that are intended for targets on the PCI bus 50 (including targets on the EISA bus) are made through the PCI master logic 285. PCI master 285 and PCI slave 290 couple to the system management arbiter 210 to initiate requests to obtain mastership of the system management local bus 75. Mastership grants are routed from the system management arbiter 210 to the PCI master 285 and PCI slave 290. The PCI interface 205 also preferably couples to address translation logic 240 and local bus path logic 265.

The PCI slave logic 205 preferably has associated with it a force retry bit which operates under system management processor control. Assertion of the force retry bit by the SMP 150 insures that the system management module 100 will not be interrupted by PCI bus cycles during SMP accesses to local peripherals such as the VGA controller or the keyboard controller. The PCI interface 205 preferably has complete access to the entire host system when acting as a PCI master. In addition, the PCI interface controller 205 provides the system management processor 150 exclusive access to any system peripheral within the host system.

In the preferred embodiment, the PCI interface controller 205 preferably has the capability to run configuration cycles to configure devices on the PCI bus 50. As one skilled in the art will understand, devices on the PCI bus 50 are configured during configuration cycles by assigning an address range and an interrupt to the device. In accordance with the preferred embodiment, the SMC 200 monitors activity on the PCI bus 50 and the SMR 76 monitors activity on the EISA bus 60, and determines when a device on these busses fail. The present invention envisions the possibility of providing a back-up component on the PCI or EISA bus which is then used as a spare for the failed component. Thus, in the event that a system component fails, and a spare device is available in the system, the PCI interface controller 205 may initiate a configuration cycle to dynamically substitute the failed component with the spare. The PCI interface controller 205 preferably includes configurable memory mapping capabilities to enable PCI memory and I/O addresses to be modified. The system management registers 260 preferably are double mapped to PCI configuration space and to programmable EISA specific slots for software access. In the event that a component fails on the PCI bus or in an EISA specific slot, an alternative component that is memory mapped may be dynamically switched and activated by the system management central 200.

Figure 6:
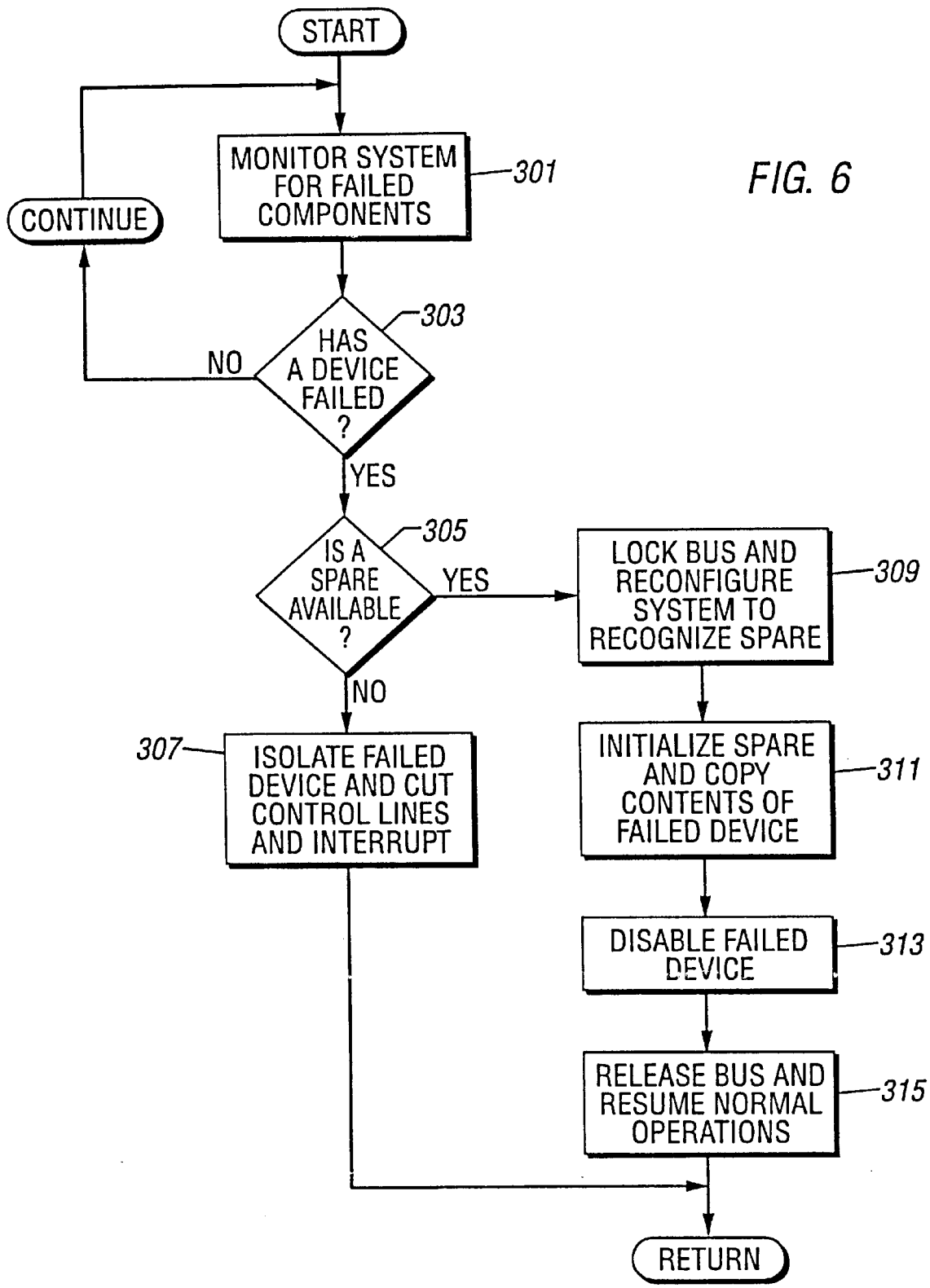
FIG. 6 is a flow chart illustrating the operation of the SMC when dynamically switching to spare components in the event of a failed component.

One exemplary embodiment for implementing the dynamic switching of spare components is shown in FIGS. 6 and 7. As shown in FIG. 7, the SMM 100 connects to the PCI bus 50 through address, data and control lines in accordance with normal convention. Three control signals have been shown which are generated by the SMM 100 as part of the dynamic switching capabilities. One skilled in the art will understand that these signals may be encoded using existing control lines (or combinations of lines), or may be implemented by adding additional control lines. Thus, the arbiter in the SMC does not give grant to any master other than SMC to completely lock the PCI bus 50 during the reconfiguration process. While in the bus lock condition all PCI masters are disabled from accessing the PCI bus absent except for the SMC on behalf of the SMP. The SMM 100 also generates a reset (RESET [n:1]) signal that is directed to the failed component 330 via an SMR to disable that device from further operations. The SMM 100 also generates an initialize spare (INIT SPARE) signal that is directed to the spare component 340 on the bus to initialize operation of the spare. As shown in the exemplary embodiment of FIG. 7, the SMM 100 includes a memory map 360 of system resources. Although the memory map is shown residing in the SMM 100, one skilled in the art will understand that the memory map may be physically located at some other location in the system. The memory map 360 preferably includes the current address range for each of the system resources, and also includes an address for each of the spare components provided in the system, plus an indication of the devices in the system for which the spare may be substituted. The memory map preferably is configurable to permit address ranges to be changed as required during switching and other system operations. Thus, if a spare is to be substituted for another device, the address range of the spare may be changed to what previously was the address range for the failed device. The address range for the failed device also is changed, or the failed device is completely disabled to prevent bus contention. As an alternative, each of the system components may be notified of the new address of the spare component, if the system components support such capabilities.

Referring now to FIGS. 4 and 6, FIG. 6 is an exemplary routine for implementing dynamic switching. In step 301 the SMC 200 (preferably the PCI arbiter and monitor logic 225) monitors the system for failed components. If there are no component failures, the SMC continues normal monitoring and alarm operations in accordance with the principles of the present invention. If the SMC discovers that a device has failed in step 303, the SMP next checks (step 305) its configuration registers to determine if a spare device is present in the system which can assume the duties of the failed component. If no spare is available, the SMP isolates the failed device and cuts the request, grant and interrupt lines for the failed device (step 307). If the failed device is located on the EISA bus, the SMP initiates a slot specific reset in an attempt to reset the failed component. The reset is transmitted to the failed components via the SMC, through the SMR. If the device continues to fail and causes the EISA bus to fail, the SMP may disable the PCI-EISA bridge 85 to prevent transactions between the PCI bus and the EISA bus.

If a suitable spare component has been provided in the system, the SMR in step 309 goes into the bus lock state by setting the SMC_Bus_Lock bit in the SMC. In response, the arbiter refuses to grant mastership to other PCI masters other than the SMC. The SMP also reconfigures the memory map, if necessary to associate the spare component with an address range. In step 311, the SMP copies the contents of the failed component to the spare device. After the copying is complete, the SMP then initializes the spare component, preferably by assigning an interrupt and an address range to the spare component. If the spare is given the address range of the failed component, the assignment of the address range may be delayed until after the failed component is disabled. In step 313 the failed device is disabled, and in step 315 the SMC_Bus_Lock bit is deasserted to permit the system to resume normal operations.

Alternatively, the PCI interface controller 205 may reconfigure the memory map in step 309 to disable the address range previously assigned to the failed component, and may then assign a new range to the spare component in the memory map. As one skilled in the art will understand, the I/O address ranges on the EISA bus are slot specific. Thus, to switch in a spare component on the EISA bus, the address range for the failed component must be switched to the new address range for subsequent transactions.

Thus, in the event that a spare device is provided in the computer system as a back-up to system component, the SMP via the SMC (and through the SMC) can disable the system component in the event of failure, and can dynamically reconfigure the system to enable the spare to assume the functions of the disabled component. At the completion of the reconfiguration cycle, the bus lock condition is removed, and the computer system resumes normal operation.

Referring still to FIG. 4, address translation logic 240 functions to translate address signals on the PCI bus 50 and the system management local bus 75 to correspond to appropriate bus protocols. The PCI bus 50 preferably is 32 bits wide and the SM local bus 75 is either 16 bits or 8 bits wide. The address translator 240 takes SM addresses and converts these addresses to PCI addresses, and similarly, converts PCI addresses to appropriate SM address values. A local bus data path module 265 contains all the logic that is used to capture data from the SM bus 75 and for multiplexing data from the PCI bus 50 to the SM bus 75.

As shown in FIG. 3, other control signals between the SMP 150 and the SMC 200 preferably include the READY signal and a next address signal NA driven by the SMC 200 to indicate when the SMP 150 can proceed with the next cycle. The signal READY is driven low by the processor controller 275 to indicate the end of the current transaction. In pipelined operations, the signal NA is asserted low to indicate that the SMP 150 can provide the address of the next cycle. The output control signals (shown generally in FIG. 3 as signals SC) of the 386EX processor also include an address status (ADS) signal to indicate a valid bus cycle, a data/control (D/C) signal to indicate if the current cycle is a data cycle or a control cycle, a memory/IO (M/IO) signal to indicate if the current cycle is a memory or I/O cycle, a REFRESH signal to indicate a refresh cycle, a SMM management mode (SMIACT) signal to indicate that the processor is in system management mode, and the signal PWR to indicate a processor write or read cycle.

The address translation logic 240 is capable of redirecting system ROM so that the SMC can get the host's CPU to use the system management ROM 160 instead of the host system ROM 15. The address translation logic 240 preferably provides support for memory mapped I/O from the PCI bus 50 to the system management local bus 75 and from the system management local bus to the PCI bus. Thus, the address translation logic 240 permits address translation and space translation of PCI memory cycles to system management module input/output and/or memory space (space translation permits conversion of an I/O cycle to a memory cycle and/or conversion of a memory cycle to an I/O cycle.) This permits access to I/O locations on the system management module 100 that are already occupied by other devices in the host system I/O space. Similarly, the address translation logic 240 provides address translation and space translation of SMM memory cycles to PCI I/O and/or memory space. This permits access to I/O locations on the host system that are already occupied by other devices in the SMM I/O space. The address translation logic 240 also directs SMM cycles to either the SM bus or to the PCI bus depending upon the address.

Referring now to FIGS. 3 and 4, the system management arbiter 210 serves as the main arbitration unit for the system management local bus 75. Thus, all mastership requests for the SM local bus 75 are received and processed by the SM arbiter 210. In accordance with the preferred embodiment, the system management local bus comprises a modified ISA bus type bus system. The SM arbiter 210 preferably couples to local bus control 270, processor control 275, memory control 280, local bus path logic 265, and PCI interface logic 205. The primary masters of the SM local bus 75 are the SMP 150 and the SMC 200 (specifically, the PCI slave logic 290) on behalf of another PCI (or EISA) master.

The SMP 150 is the default master on the SM bus 75 after system reset. If the SMC 200 desires to run a cycle on the SM bus 75, it asserts a bus hold request signal HOLD to the SMP 150 to request control of the SM bus 75. The SMP 150 responds by asserting a signal HLDA to surrender control of the SM bus 75. If the signal HOLD is asserted, and the SMP 150 has a refresh cycle pending, the SMP 150 negates the signal HLDA to request control of the SM bus 75. Upon sampling the signal HLDA, and after completion of the SMC cycle, the SMC 200 negates the signal HOLD to let SMP 150 run the refresh cycle. The SMP 150 performs the arbitration between SMP and refresh accesses to the local bus 75.

Referring still to FIGS. 3 and 4, a signal ADFLT for tri-stating the address and data outputs of the SMP 150 is provided by the SM arbiter 210 to the SMP 150. As mentioned above, there are two possible masters on the SM local bus 75, the SMP 150 and a PCI bus master. A request from the SMP 150 is indicated by a processor request (PREQ) signal asserted by the processor controller 275 to the SM arbiter 210. A request from a PCI bus master is indicated by a local bus request (ISLREQ) signal generated by PCI slave logic 290 in the PCI interface controller 205 to SM arbiter 210. The various cycles executable by the modules in the SMC 200 preferably include a refresh cycle to SM DRAM 110, a PCI cycle to the video controller 175, a SMP cycle to SMC registers 260 (which include various memory and I/O map registers and configuration registers), a PCI cycle to the SMC registers 260, an SMP cycle or a PCI master cycle to the SM memory 110; an SMP cycle or a PCI master cycle to the SM ROM 160, a SMP cycle or a PCI master cycle to the SM local bus 75, a SMP cycle or a PCI master cycle to the IEEE 1149.1 standard test bus controller (JTAG) logic 220, and a SMP cycle to the video controller 175. The SMP 150 also provides a processor read/write (PWR) signal to the SM arbiter 210 indicating processor read or write cycles. When a PCI master is requesting a cycle to a target in the SMM 100, the SM arbiter 210 asserts a hold (HOLD) signal to the SMP 150, which the SMP 150 acknowledges by asserting the hold acknowledge (HLDA) signal. Cycles on the SM local bus 75, other than to the SM memory 110, requested by the SMP 150 or a PCI bus master are generated by the local bus controller 270. The local bus controller 270 controls accesses to the video controller 175 and the SM ROM 160.

If the SM arbiter 210 detects a request for the SM local bus 75, the video controller 175, or the ROM 160, from either the SMP 150 or the PCI slave logic 290, the SM arbiter asserts a run local bus cycle (RUNLBCYCLE) signal to the local bus controller 270. In response to assertion of the RUNLBCYCLE signal, the local bus controller 270 generates the appropriate cycles on the SM local bus 75. Once the requested local bus cycle has completed, the local bus controller 270 asserts a local bus cycle done (LBCYCLEDONE) signal back to the SM arbiter 210 to indicate completion of the local bus cycle. When the SM arbiter 210 detects the LBCYCLEDONE signal asserted, it negates the RUNLBCYCLE signal.

If the SM arbiter 210 detects a request for the SM memory 110 from the SMP 150 or from a PCI bus master, it asserts a RUNMEMCYCLE signal to the memory controller 280. Memory requests from the SMP 150 include read and write cycles as well as memory refresh cycles. As noted earlier, the SMP 150 preferably includes logic to arbitrate between refresh and other memory cycles. In response to assertion of the signal RUNMEMCYCLE, the memory controller 280 provides the necessary control signals to the SM memory 110 to perform the requested operation. When a memory operation is completed, the memory controller 280 asserts a memory cycle done (MEMCYCLEDONE) signal back to the SM arbiter 210. In response, the SM arbiter 210 negates the signal RUNMEMCYCLE. If the SM arbiter 210 detects a SMP-to-PCI cycle, it asserts a signal RUNIMSTCYCLE to PCI master logic 285 in the PCI interface controller 205. In response to the assertion of the signal RUNIMSTCYCLE, the PCI bus master 285 obtains control of the PCI bus 50 to run the desired cycle. Once the PCI cycle completes, the PCI master 285 responds by asserting the signal IMSTCYCLEDONE. A few clock periods later, the SM arbiter 210 deasserts the signal RUNIMSTCYCLE. When the SM arbiter 210 negates the RUNIMSTCYCLE signal, a signal D_IMSTCYCLEDONE in the PCI master logic 285 is negated one clock (PCICLK) period later, which causes the signal IMSTCYCLEDONE to be negated.

When the PCI or SM local bus cycles have completed, the SM arbiter 210 drives a signal PDONE to the processor controller 275 to indicate the completion of a SMP requested cycle, or asserts a signal ISLDONE to the PCI slave logic 290 to indicate the completion of a PCI bus master requested cycle.

Local bus control 270 couples to the system management local bus 75 and functions to control the operation on the local bus. In addition, local bus 270 couples to the SM arbiter 210. Processor controller 275 serves as an interface to the system management processor (SMP) 150 (FIG. 3). Processor controller 275 couples to SM arbiter 210, and system management local bus. Memory controller 280 controls transactions to the system management DRAM (SM DRAM) 110 (FIG. 3). The memory controller 280 in accordance with known techniques, provides row address strobe (RAS), column address strobe (CAS), and address and control signals to the system management DRAM 110 to perform memory requests. Memory controller 280 couples to command logic 250 and SM arbiter 210.

Referring now to FIG. 4, the PCI arbiter and monitor logic 225 couples to the PCI bus 50 and functions as the main PCI arbitration unit for the PCI bus. Thus, to the extent that other PCI arbiters are present in the computer system, those arbiters preferably are disabled in favor of the arbiter and monitor logic 225 in the SMC 200. PCI arbiter and monitor logic 225 preferably couples to the system management registers 260, and includes a clemency counter 227 and an event counter 229. Counters 227 and 229 may be integrated as part of PCI arbiter and monitor logic 225, as will be understood by one skilled in the art.

The PCI arbiter and monitor logic 225 monitors the PCI bus 50 to determine if signals appearing on the PCI bus are consistent with PCI protocol. If signals appear out of sequence, the PCI arbiter and monitor 225 generates an error signal which preferably is transmitted to the system management processor 150 and host processor 10. Preferably, the PCI arbiter and monitor 225 also monitors the length of time of certain transactions, including (a) the time before FRAME # is asserted after REQ # and GRANT # are asserted on the PCI bus; (b) the time before data is returned or provided after the assertion of the FRAME # signal on the PCI bus; and (c) the length of time that the PCI bus is held after the REQ # signal is negated. Measurement of the response time preferably is performed by counter 229. Counter 229 may comprise a plurality of counters for each of the different time out values or a single counter may be used with additional processing performed by the PCI arbiter and monitor logic 225. Alternatively, the PCI arbiter and monitor 225 may include one or more internal counters for performing the time-out functions.

The PCI arbiter and monitor 225 preferably captures PCI bus master lock, commands and addresses upon error occurrence on the PCI bus. In the event of a failure on the PCI bus which causes the PCI bus to "hang," the PCI arbiter and monitor 225 determines how far the current cycle has progressed. Information regarding the current bus cycle may be stored either in the PCI arbiter and monitor logic 225 or in the system management registers 260. In the event of a failure, appropriate registers bits are read back indicating the signals that had been received during the current bus transaction. Thus, for example, the PCI arbiter and monitor 225 may monitor the PCI bus for the presence of the REQ #, GRANT #, FRAME #, DEVSEL #, IRDY #, TRDY #, and various other PCI bus signals generated during the current cycle, and in response to detection of the PCI signals, may provide an appropriate signal to the system management registers 260 to load appropriate register bits. In the event of a failure, the processor controller 277 accesses the system management registers 260 to read back the appropriate register bits for the current cycle. In addition, the PCI arbiter and monitor logic 225 also preferably stores a value indicating the component that has mastership of the PCI bus, the current address and the cycle type when the PCI bus fails. For parity failures detected by the PCI arbiter and monitor 225 or other SMC components, the address or data causing the failure preferably is latched and stored in the system management registers 260.

Figure 8:
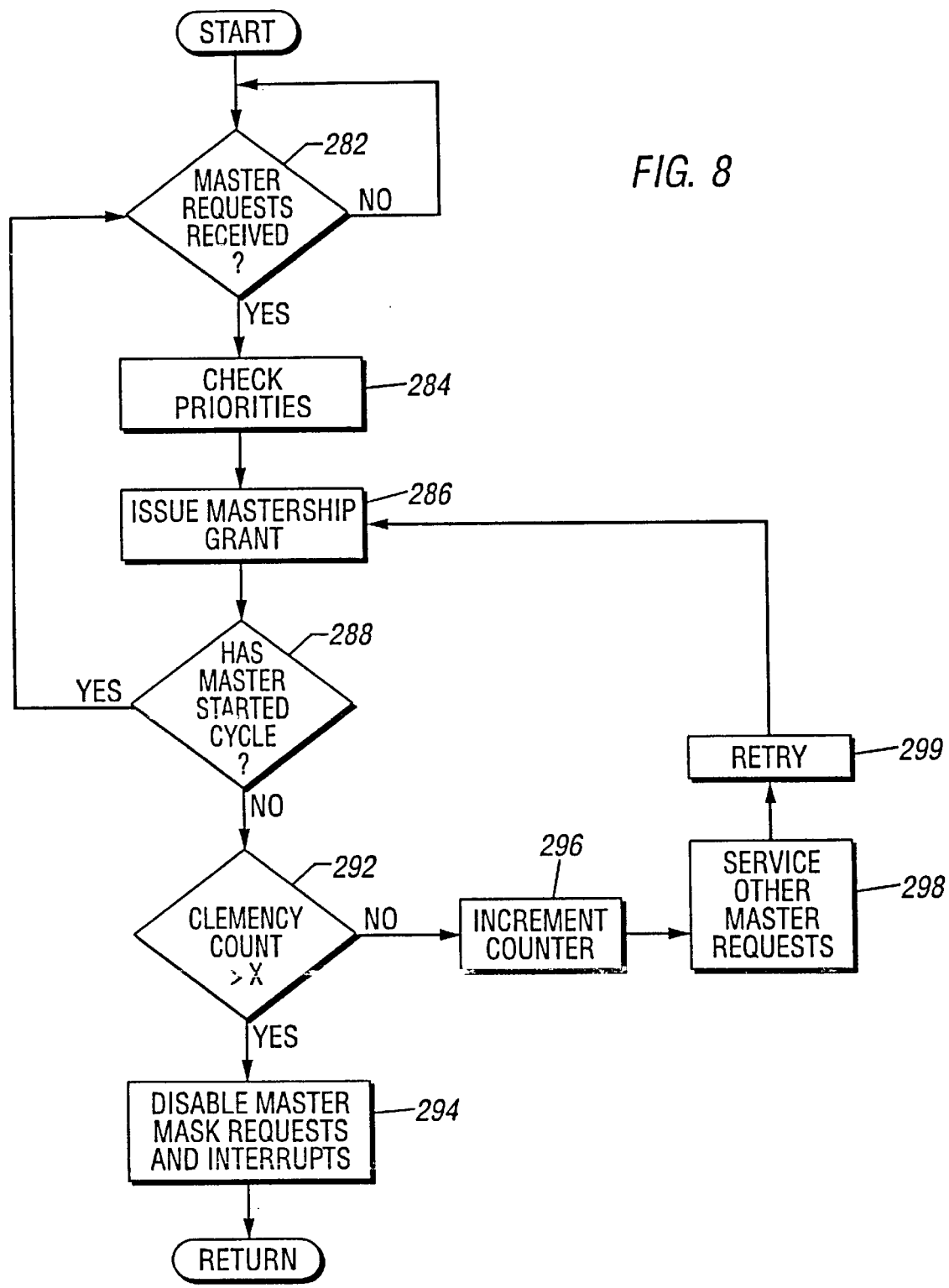
FIG. 8 is a flow chart depicting the operation of the arbitration and monitor logic of FIG. 4 for disabling faulty bus masters.

The PCI arbiter and monitor 225 also monitors the operation of components residing on the PCI bus as the main PCI arbitration unit. In the preferred embodiment, the PCI arbiter and monitor logic 225 includes the capability of generating an error signal if several accesses are made to a PCI component without a response. In this vein, and referring now to FIG. 8, the PCI arbiter and monitor logic 225 tracks the activities of the various PCI bus masters. In step 282, the PCI arbiter logic 225 determines if PCI masters have requested ownership of the PCI bus. If more than one request is received, the arbitration logic 225 checks the priorities of the requesting masters (step 284), and in step 286, issues a grant to the master with the highest priority. The PCI arbiter and monitor logic 225 then monitors the PCI bus (step 288) to determine if the master granted ownership of the bus has started a cycle. If the master does not initiate a cycle within a specified time period (as determined by event counter 229, for example), the arbiter logic 225 checks the count in the clemency counter 227 for that master. If the count in the clemency counter exceeds a predetermined threshold value x (step 292), the arbiter logic 225 disables the master in step 294 by masking the grant and interrupt lines for that master. If the count in the clemency counter 227 is less than x, the clemency counter is incremented for that master (step 296). After other master requests are serviced in step 298, the faulty master is retried in step 299.

Thus, if a PCI bus master fails to respond to a mastership grant by the PCI arbiter and monitor 225, its grant is removed if there is no other request pending as part of a normal re-arbitration. On the first grant removal, a counter (such as event counter 229) is activated and the current master number is recorded in an appropriate register in system management registers 260 or in a latch in the PCI arbiter and monitor logic 225. Subsequent retries to the same master cause a counter to be incremented. If the master responds, the clemency counter 227 is reset. If the count in the counter becomes higher than a pre-established maximum value x an error signal is asserted to the system management processor 150. In addition, the PCI arbiter and monitor logic 225 disables the ability of that bus master to obtain mastership of the PCI bus. In the preferred embodiment, a register is provided with bits dedicated to the availability of various bus masters on the PCI bus. If a failure is detected for a particular bus master, a bit is set in a dedicated bit associated with that bus master device. When a mastership request is received by the PCI arbiter and monitor logic 225, the error register is examined before mastership is granted by the PCI arbiter and monitor logic 225. While one clemency counter is shown, one skilled in the art will understand that a plurality off clemency counters may be implemented if desired.

The PCI arbiter and monitor logic 225 also preferably is capable of selecting and storing PCI bus cycles for subsequent examination. The PCI arbiter and monitor logic 225 includes a circular buffer, preferably constructed as a FIFO (first in, first out) register. In addition, the PCI arbiter and monitor logic 225 operates in association with registers in the SMC registers 260, including a bus capture register, a holding register and a cycle progress register. The PCI arbiter and monitor logic 225 causes cycles to be stored in the registers including input/output cycles, memory cycles, configuration cycles and special cycles. Values in the registers can be read by the system management processor in the case of a bus fault on the PCI bus. In addition, the bus capture register and the circular buffer preferably are not cleared during SMC resets. The bus holding register preferably comprises an intermediate register located between the bus capture register and the circular buffer.

The bus capture register and FIFO status registers are illustrated in Table III:

TABLE III

| Address:bits | Function | Sub-function |
|---|---|---|
| xx40:15–0 | (ro) Bus capture address 15–0 | low part of address |
| xx42:15–0 | (ro) Bus capture address 31–16 | high part of address |
| xx44:15–0 | (ro) Bus capture data 15–0 | low part of data |
| xx46:15–0 | (ro) Bus capture data 31–16 | high part of data |
| xx48:3–0 | (ro) Bus capture address C/BE#3:0 | command |
| xx48:7–4 | (ro) Bus capture Master granted the bus | 0:Hostbridge<br>1:EISA Bridge<br>2:SMC<br>3:DEC Bndge<br>4:slot0<br>5:slot1<br>6:slot2<br>7:slot3<br>8:slot4<br>9:slot5<br>A–F: reserved |
| xx48:11–8 | (ro) Bus capture data C/BE#3:0 | Byte enables |
| xx48:15–12 | (ro) Reserved | |
| xx4A:0 | (r) Tracker FIFO Status (Not Empty) | 1:FIFO contains data<br>0:FIFO empty |
| | (w) Tracker reset (a write to this register of any value results in resetting the Tracker FIFO and the capture register logic to allow operation to begin) | |
| xx4A:1 | (r) Tracker FIFO Status (Overrun) read clears FIFO over-run flag, if set | 1:FIFO overrun<br>0:OK |
| xx4A:15–2 | (r) reserved | |
| xx4C:0 | (ro) Tracker FIFO Control/Status (Not empty) | 1:FIFO contains data<br>0:FIFO empty |
| xx4C:1 | (ro) Tracker FIFO Control/Status (overrun) if set, read clears FIFO over-run flag; else if Not empty, read increments FIFO read pointer | 1:FIFO overrun<br>0:OK |
| xx4C:15–2 | (ro) reserved | |

The cycle progress registers are used to indicate the progress of the current transaction on the PCI bus. An example of the tracker registers is shown in Table IV:

TABLE IV

| Address:bits | Function | Sub-function |
|---|---|---|
| xx4E:0 | (ro) Cycle progress: FRAME | |
| xx4E:1 | (ro) Cycle progress: DUAL ADDRESS | |
| xx4E:2 | (ro) Cycle progress: DEVSEL | |
| xx4E:3 | (ro) Cycle progress: IRDY | |
| xx4E:4 | (ro) Cycle progress: TRDY | |
| xx4E:5 | (ro) Cycle progress: BURST (multiple data's) | |
| xx4E:6 | (ro) Cycle progress: LOCK&FRAME | access to locked agent |
| xx4E:7 | (ro) Cycle progress: LOCKED | !LOCK&FRAME followed by LOCK |
| xx4E:8 | (ro) Cycle progress: .RETRY | |
| xx4E:9 | (ro) Cycle progress: DISCONNECT | |
| xx4E:10 | (ro) Cycle progress: TARGET ABORT | |
| xx4E:15–11 | (ro) reserved | |

TABLE IV-continued

| Address:bits | Function | Sub-function |
| --- | --- | --- |
| xx50:15–0 | (ro) Tracker FIFO address 15–0 | low part of address |
| xx52:15–0 | (ro) Tracker FIFO address 31–16 | high part of address |
| xx54:15–0 | (ro) Tracker FIFO data 15–0 | low part of address |
| xx56:15–0 | (ro) Tracker FIFO data 31–16 | high part of address |
| xx58:3–0 | (ro) Tracker FIFO address C/BE# 3:0 | command |
| xx58:7–4 | (ro) Tracker FIFO Master granted the bus | 0:Host bridge<br>1:EISA Bridge<br>2:SMC<br>3:DEC Bridge<br>4:slot0<br>5:slot1<br>6:slot2<br>7:slot3<br>8:slot4<br>9:slot5<br>A–F:reserved |
| xx58:11–8 | (ro) Tracker FIFO data C/BE# 3:0 | Byte enables |
| xx58:12 | (ro) Tracker FIFO progress: DUAL ADDRESS | Indicates that a 64-bit address was attempted |
| xx58:13 | (ro) Tracker FIFO progress: LOCKED | !LOCK&FRAME followed by LOCK |
| xx58:14 | (ro) Tracker FIFO progress: BURST (multiple data's) | Indicates that there was more than one data cycle |
| xx58:15 | (ro) Tracker FIFO progress: DISCONNECT | Indicates that target disconnected |

The system management registers 260 preferably include nine address range register sets which can be programmed with the address ranges of PCI access cycles. The range registers also are preferably used to specify the addresses of targets to monitor by the PCI arbiter and monitor logic 225. In the preferred embodiment, four range registers are provided from memory cycles, four range registers are provided for input/output cycles and one range register is provided for configuration cycles. Also, preferably a special enable bit is provided for special cycles.

In the preferred embodiment, the PCI arbiter and monitor logic 225 is capable of determining bus master usage, total bus master access latency, total target latency, bus master access latency, the number of retries to a particular PCI device, the number of PCI bytes transferred in a particular cycle, the amount of time that the PCI master holds the bus after the negation of the REQ signal, and various other performance criteria.

The system management registers 260 preferably are accessible either by I/O or PCI configuration cycles from the PCI bus 50 or by I/O cycles from the system management local bus 75. The SMC 200 preferably is capable of individually disabling any input/output or memory region from either the PCI side or the system management side, and can also disable the source of any detected error. To expand the system management processor address base from 64 megabytes to four gigabytes, the SMC 200 translates SMP addresses using segment registers. The SMC 200 is initialized once the power source (either system power or battery backup 97) is confirmed as acceptable (battery ok is asserted). After power up, the SMC 200 determines clock phases and asserts a synchronous reset to the SMP 150 and to the SMR's in the system.

The PCI arbiter and monitor logic 225 preferably receives bus mastership requests and assigns or grants mastership of the PCI bus 50. If a bus master fails, the arbitration and monitor logic 225 deactivates the failed device. Whether a master has failed can be determined using various methods. One method which can be used to determine whether a master has failed is through software. Thus, a software diagnostic utility can be run periodically on the system to monitor the response of each device on the bus. If the arbiter and monitor logic 225 determines that a device has failed, it can ignore all mastership requests from that device, and refuse to grant mastership to the failed device. In addition, the SMC 200 can mask the interrupt requests from the failed master through the interrupt routing implementation shown in more detail in FIG. 5. The SMC 200 receives all of the interrupts in the system through various busses and passes the interrupts to the SMP 150.

A number of SMR units are dispersed through the system to provide additional monitoring capabilities for the SMM 100. The SMR's communicate with the SMC 200 via high speed bi-directional serial busses (either the GI bus or the ICIB bus) and the IEEE 1149.1 standard test bus. Time division multiplexing is used on the GI bus or the ICIB bus, with the SMC driving high, and the SMR's driving low. The devices on the serial bus are synchronized to a particular counter.

In the preferred embodiment, each of the SMR devices share a common architecture. Thus, in FIG. 10 an exemplary SMR unit 700 is shown with the understanding that the configuration of the SMR devices (for example, SMR units 71, 72, 73, 76) preferably implements the same configuration as SMR 700. The SMR 700 preferably includes a JTAG slave logic 705, an IIC logic 710, a general purpose input/output logic 715, interrupt bus logic 720 and bus monitor logic 725. The SMR 700 preferably communicates with the SMC 200 (FIG. 3) through the JTAG logic 705. The SMR 700 communicates with other peripheral devices through the IIC logic 710.

The IIC logic 710 preferably comprises a two-pin interface that connects to various slave peripherals, including non-volatile RAM's, temperature sensors, and analog-to-digital converters. The two pins controlled by the IIC logic 710 are a serial clock interface (SCL) and a serial data interface (SDA). These two pins make up the IIC bus, which implements a protocol developed by Philips Semiconductor, Inc. The SCL and SDA pins are bi-directional, and the SMR both drives and samples these pins at the same time. The SMR 700 can operate as either a master or slave device on the IIC bus. On the IIC bus, the master is the device that initiates a start condition by changing the state of the SDA from high to low while SCL is high. The master maintains responsibility for controlling the SCL line throughout the transaction. The slave either sends data to or receives data from the master. After a cycle is initiated, the master transmits a 7 bit address and a write/read bit. The receiver then transmits an acknowledge pulse. All subsequent transmissions are 8 bit data pulses followed by an acknowledge pulse. The transaction is concluded by generation of a low to high transition on SDA while SCL is high by the master.

After each byte is transferred across the IIC bus, the IIC logic 710 issues an interrupt to the SMC 200 through the IBUS logic 720. In accordance with the preferred embodiment of FIGS. 2 and 3, the IBUS comprises either the GI bus 75 or ICIB bus 60. The interrupt on the GI bus 75 or ICIB bus 60 is a request for more data if the SMR is transmitting or a request to clear a data buffer if the SMR is receiving. The IIC logic 710 also issues an interrupt when it is addressed by another master starting a transaction. In the preferred embodiment, the IIC logic 710 includes four registers, an address register 712, an IIC clock register 714, a data shift register 716, and a control/status register 718. The address register 712 contains a 7 bit address which the SMR transmits when addressed as a slave. The clock register 714 stores the clock frequency implemented on the IIC bus. This frequency is programmed into the clock register during initialization. The data shift register 716 performs all serial-to-parallel interfacing with the IIC bus. The control/status register 718 contains the IIC bus status information required for bus access and monitoring.

Referring now to FIGS. 2, 3 and 10, the bus monitor logic 725 preferably monitors a peripheral or system bus for usage and errors. In the preferred embodiment, thirty-one input/output pins are used to monitor the peripheral bus. The pins are configurable to permit the bus monitor logic 725 to monitor various busses, such as the host bus 35 or EISA bus 60 (FIG. 2). Thus, the bus monitor logic 725 is configured into a particular mode of operation during initialization. In the preferred embodiment, bits 4 and 5 of the SMR configuration register 727 (address 12h) are dedicated to defining the mode of operation for the bus monitor logic 725. Available modes include a first and second host mode (host mode 1 and host mode 2) and an EISA mode. Thus, if configured for the EISA mode, the bus monitor logic 725 checks the EISA bus for various types of errors, and also collects statistics showing EISA bus usage. The bus monitor logic 725 preferably contains a RESDRV input pin that connects to the RESDRV of the EISA controller. The SMR bus monitor logic 725 preferably includes several output pins that are used to assert RESDRV to each slot of the EISA bus. The bus monitor logic 725 also preferably receives the EISA MAK # signals.

As will be understood by one skilled in the art, the EISA controller asserts RESDRV as a response to an EISA bus error. The bus monitor logic 725 intercepts this signal and generates an interrupt to the SMP 150 (FIG. 3) via the IBUS (which for the EISA SMR 76 is the ICIB bus). The SMR signals this interrupt to the SMC 200 (FIG. 3) by asserting an interrupt on slot 2 of the ICIB bus. The SMC 200 then passes this interrupt to the SMP. After receiving the RESDRV interrupt, the SMP 150 determines the MAK # signals on the EISA bus by reading the status of a MAK # latch register in bus monitor logic 725. After determining which master had control of the bus when RESDRV was asserted, the SMP 150 causes a slot-specific RESDRV to be sent to the offending master.

Referring again to FIG. 10, the SMR bus monitor logic 725 preferably includes counters (not shown specifically) to track the EISA bus total bus utilization and also the bus utilization due to EISA bus master activity for each slot. In the preferred embodiment, the bus monitor logic 725 includes inputs lines for coupling to the following EISA signal lines: CMD#, REFRESH, NMFLUSH, EISAHLDA, START#, EMAK1, EMAK2, EMAK3, MRQ#[0:5] and BCLK. Total bus utilization is developed by summing the START#, CMD#, and EISAHLDA signals, after multiplying each of the time that these signals are asserted by BCLK to make transparent the effect of stretching BCLK. Thus, total bus utilization=BCLK(START# asserted)+BCLK(CMD# asserted)+BCLK(EISAHLDA asserted). Bus utilization due to EISA bus master activity is based upon the MRQ# and MAK# inputs as follows:

Busmaster util=!REFRESH & [BCLK(MAK# low)+BCLK(MRQ# low after MAK# high)]

Each bus master slot has a separate counter. The utilization for each slot is found by dividing the count for that slot by the count of the free counter.

The bus monitor logic 725 preferably determines two types of EISA bus violations, CMD* time-out and Refresh hold-off. A time-out violation occurs if the bus monitor logic 725 determines that any device on the bus has asserted CMD# for more than 256 BCLK's. If a time-out occurs, the SMR signals the SMC by asserting an interrupt on the ICIB bus. Similarly, the SMR generates a refresh hold-off violation if the REFRESH signal is not asserted for 256 BCLK's. In somewhat similar fashion the bus monitor logic 725 also is capable of monitoring the host bus to detect bus utilization.

When in the EISA mode, the SMR 700 asserts interrupt requests on the EISA bus as requested by the SMC. The SMC identifies the interrupt requests to assert and transmits those interrupt requests to the SMR across the IBUS. The SMR asserts the interrupt request until the SMC transmits a stop signal to the SMR. Thus, whatever the SMC drives to the SMR on the IBUS at a particular slot corresponds to what the SMR will drive on the EISA bus for that interrupt request level.

Referring again to FIG. 10, the general purpose input/output logic 715 is used to assert, de-assert, tri-state, or check the value of a bit. The general purpose I/O logic 715 includes registers (not shown specifically) that control or check the level of various output pins. When the EISA mode is selected in the SMR configuration register 727, the general purpose I/O logic 715 changes its functionality, and all inputs preferably become inputs for the interrupt requests on the EISA bus. These inputs then are used to pass interrupt requests to the SMC via the IBUS. Slots are reserved in the IBUS for each input. When in the EISA mode, the inputs are routed through a series of latches which filter glitches on the EISA interrupt lines. The inputs are sampled on the rising edge of BCLK and latched. An interrupt which is asserted for greater than the period of the glitch filter but then goes away is latched inside the SMR and transmitted to the SMC. An interrupt which is less than the period of the glitch filter is ignored. An interrupt which is asserted for a period longer than the cycle time for the slots on the IBUS is not transmitted to the SMC again.

The interrupt bus interface logic 720 connects the SMR 700 to a one pin specialized bus, which preferably is either the GI bus or the ICIB bus (referred to generically in FIG. 10 as the IBUS). This bus is used by the SMR 700 to send an asynchronous signal to the SMC 200 (FIG. 3). Upon receipt of the signal, the SMC 200 services the SMR 700. The interrupt bus functions as a 16 state counter, with each SMR allowed to interrupt only during one of the 16 states.

When operating in the EISA mode, the IBUS interface 720 becomes bi-directional. The SMR then senses the state of the IBUS when not driving. When the IBUS is driven low, the corresponding EISA interrupt request is asserted. The interrupt requests preferably are asserted through the general purpose block logic 715. The IBUS logic includes an 8-bit register 722 which identifies the source of the interrupt. Another 8-bit register 724 stores the interrupt address in the first four bits. The interrupt address causes the interrupt to be asserted in the slot corresponding to the hexadecimal value in the first four bits of register 724.

The JTAG slave logic 705 is based upon the Compaq JTAG slave standard cell design; however, the standard cell design is modified to permit the JTAG lines to be used for communication to all registers within the SMR. The SMR is connected to the SMC and the other SMR's via the IEEE 1149.1 compatible standard test bus (JTAG bus [4:0]) set up in a ring configuration. The slave logic 705 includes a JTAG multiplexer (not shown specifically) that expands the JTAG chain, allowing the JTAG slave to select any of six JTAG chains with which the SMR interfaces.

Upon being powered up, the IIC address register 712 and clock register 714 must be initialized. The SMR initialization state machine controls the IIC control logic 710 to read in initial values for these registers. The SMR preferably attaches to a non-volatile EEPROM via the IIC bus, which stores the initialization values. Once initialized, the SMR connects to various sensors through an analog-to-digital converter(s) for monitoring temperature, voltage levels, noise in various components, system bus utilization, and other functions. The SMR also performs certain miscellaneous functions such as fan speed monitoring, error display control for the front panel of the computer system, power management for energy conservation, tamper reporting, and serial number management. The information in the EEPROM configures the SMR's registers, counters and timers, and also preferably stores historical information regarding the SMR and the parameters monitored by the SMR.

Thus, in summary, if a failure occurs on the EISA bus, the EISA monitoring SMR can reset the EISA bus, or can reset slots on the EISA bus. If problems continue on the EISA bus, the PCI-EISA bridge can be disabled by the PCI arbiter and monitor logic 225. The error is then reported via the SM modem or SM NIC to a remote site.

Referring again to FIG. 4, the PCI arbitration unit 225 preferably is capable of assigning priority based upon the master-target combinations. Most arbitration schemes are based either on a round-robin approach with no priorities, or have priorities assigned to each master. In the preferred embodiment of the present invention, the master-target combination is used to determine priorities. In accordance with the preferred embodiment, the SMC registers 260 preferably includes priority register files identifying high priority master-target pairs. Thus, four registers may be provided to identify high priority master-target combinations, as shown in Table V:

TABLE V

| PRIORITY REGISTER # | MASTER | TARGET |
| --- | --- | --- |
| 1 | AAAAAAAA | WWWWWWWW |
| 2 | BBBBBBBB | XXXXXXXXXX |
| 3 | CCCCCCCC | YYYYYYYYY |
| 4 | DDDDDD | ZZZZZZZZZZ |

Figure 9:
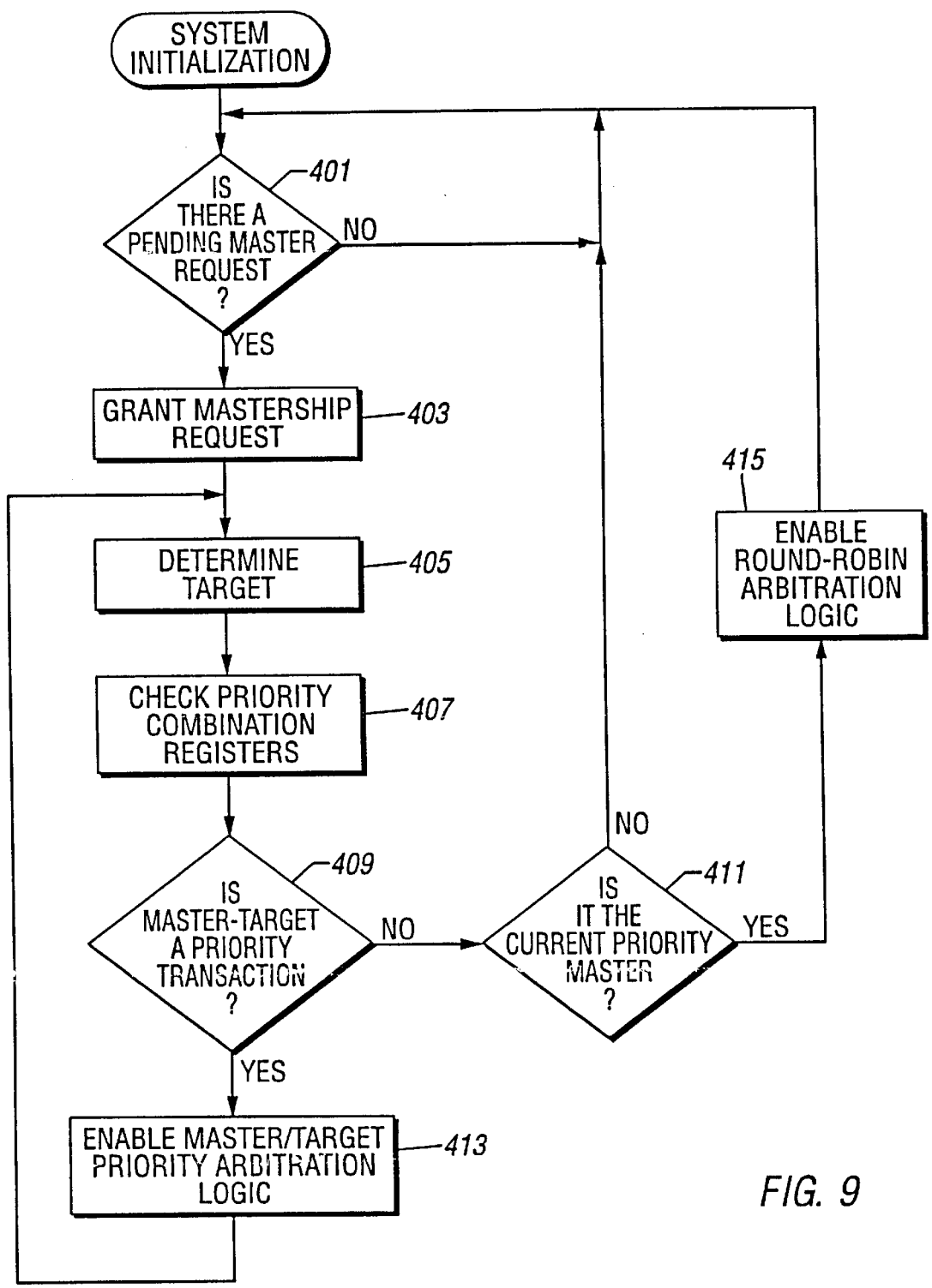
FIG. 9 is a flow chart illustrating the master-target based arbitration performed by the arbitration and monitor logic of FIG. 4.

Thus, as shown in the flow chart of FIG. 9, the arbitration and monitor logic 225 determines in step 401 whether a mastership request appears on the PCI bus. If a mastership request does appear, the arbitration logic 225 awards mastership in step 403 based upon either a round-robin approach, or based upon priorities assigned to specific masters, in accordance with conventional techniques. After mastership is granted, the arbitration and monitor logic 225 determines the target of the current cycle in step 405. In step 407, the arbitration and monitor logic 225 checks the current master-target combination to determine if the combination has been determined to be a high priority combination, as specified in the high priority registers (see for example TABLE V).

If in step 409 the arbitration and monitor logic 225 determines the present master-target is a high priority combination, the arbitration logic engages a priority mode of operation in step 413. If in step 411 the arbitration and monitor logic 225 determines the current priority master has ceased operation to the current priority slave, the arbitration logic returns to a normal mode of operation.

Thus, after granting mastership of the PCI bus, the arbitration and monitor logic 225 preferably monitors the target address. Once the target address is determined for the current transaction, the arbitration and monitor logic 225 compares the master and target address with the combinations listed in the priority registers (Table V). If a match is found, that master is elevated to the highest priority as long as that master continues to request mastership of the bus. One skilled in the art will understand that more or less than four registers may be provided to specify greater or fewer than four high priority master-target combinations. In addition, one register may be used to encode more than one master-target pair depending upon the register size and the number of bits required to specify the address of the master and target. Further, although the present invention is discussed by referencing the PCI bus, one skilled in the art will understand that the present invention can be used on other bus systems as well which have bus mastership capabilities.

Figure 11A:
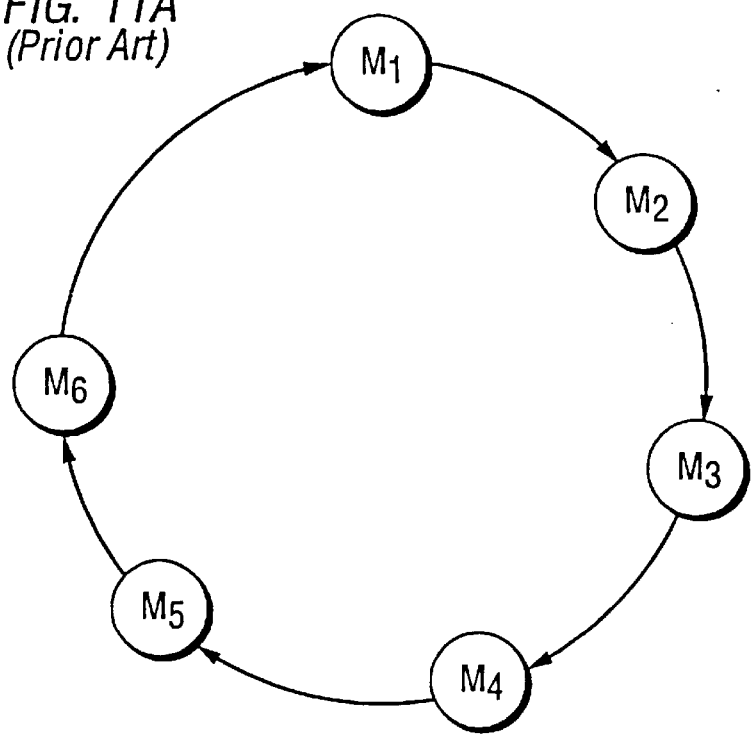
FIG. 11A depicts a prior art arbitration scheme using round robin logic.

A conventional round robin arbitration scheme is shown in FIG. 11A. Six masters (M1, M2, M3, M4, M5, M6) are depicted for purposes of illustration. In conventional round robin logic, the arbitration unit sequentially rotates to each master to look for a grant request. In the absence of a grant request, the next master is checked for a grant request.

Figure 11B:
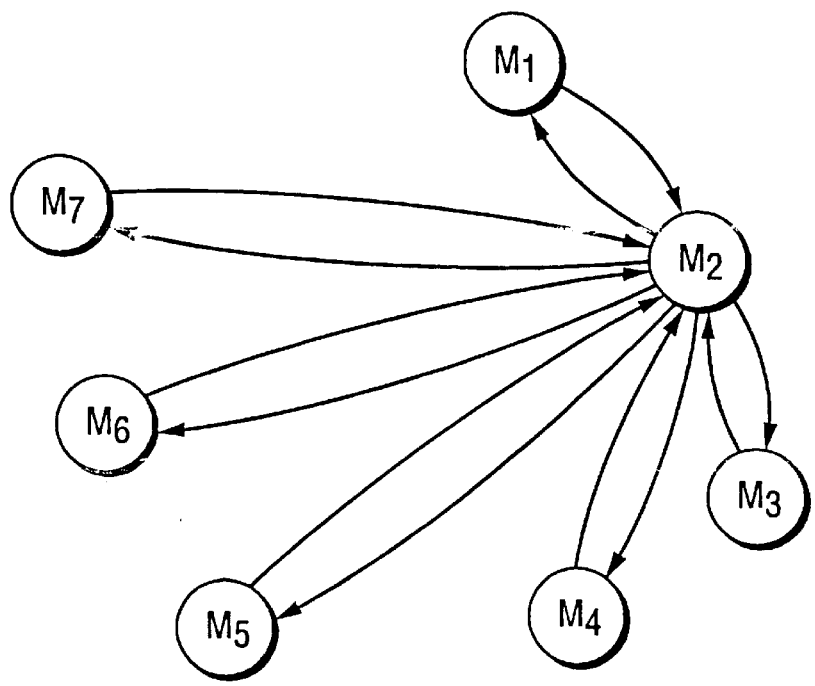
FIG. 11B depicts an arbitration scheme implementing exemplary Master/Target priority logic.

In the master/target scheme shown in FIG. 11B, the M2 master has been determined to be addressing a target that has been predetermined to be a high priority master/target pair (such as, for example, a CPU master and a video controller slave). Thus, the arbitration unit returns to the high priority M2 Master after completing a mastership cycle with another master. Thus, as shown in FIG. 11B, after a M1 Master cycle, M2 is granted mastership. The next master cycle is granted to M3, with M2 again given a grant in the next master cycle. In this fashion, the high priority master is given every other mastership cycle which is addressing a high priority target.

Referring still to FIG. 4, interrupt routing logic 235 receives interrupt requests from various components in the system. Thus, interrupt routing logic 235 receives interrupt requests originating on the PCI bus 50, interrupt requests originating on the EISA bus, PCMCIA interrupt requests, mouse and keyboard interrupt requests, and other requests made on or transmitted via the APIC bus. In addition, interrupt routing logic 235 preferably receives signals from the SMR's 71, 72, 73 (FIG. 2) via the GI bus 70. Interrupt logic 235 also receives a signal from the SMR 76 via the ICIB bus 65. Both the GI bus 70 and the ICIB bus 65 preferably are bi-directional serial busses which use time division multiplexing to schedule transmissions. If the source of an interrupt cannot be determined, the IEEE 1149.1 standard test bus is used to assist in locating the source of interrupts. As shown on FIG. 4, signals on the APIC bus are routed through APIC I/O 215. An IEEE 1149.1 compatible bus controller 220 functions to couple the SMC 200 to the IEEE 1149.1 standard test bus. The IEEE 1149.1 compatible bus controller 220 couples to command logic 250. In accordance with the preferred embodiment, command logic 250 initiates cycles on the IEEE 1149.1 standard test bus 81 to assist in locating the source of interrupts. In addition, other control signals may be transferred through the IEEE 1149.1 standard test bus 81. Thus, for example, in instances where the PCI bus is inoperable, the SMC 200 still may perform cycles to other system components via the IEEE 1149.1 standard test bus. Thus, in a failed system, the SMC 200 can interrogate other system components through test vectors stored in EEPROM, which are generated using Texas Instrument Asset tools and Victory software. The IEEE 1149.1 compatible bus controller 220 preferably includes both a master block and a slave block to permit two SMC units to communicate if more than one SMC unit is provided in the system. Each block has its own set of JTAG pins so that the IEEE 1149.1 standard test bus 81 may be used to configure and control the SMR's, and to write to other devices on an IIC bus (or other bus) via a JTAG-to-IIC bridge in the SMR. The SMC IEEE 1149.1 standard test controller 220 is accessible by both the SMP 150 and the host CPU 10.

Figure 5:
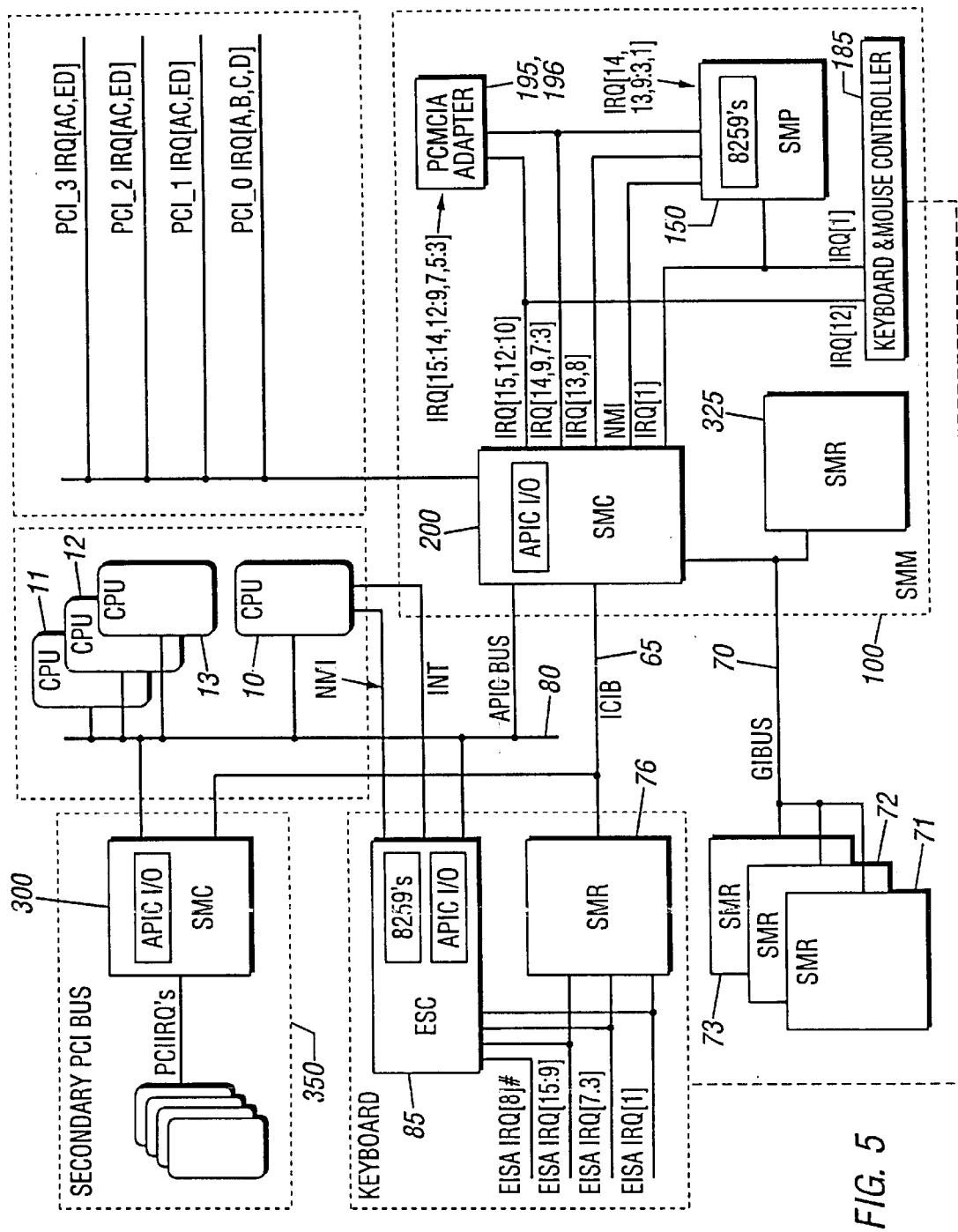
FIG. 5 is a functional block diagram showing the routing of interrupt signals in the host server system.

Referring now to FIGS. 4 and 5, the SMC 200 collects remote interrupt requests for the SMP 150 and the host CPU 10 to read. Several SMP state machines detect and report abnormal conditions by setting error bits. Once the SMC detects an error condition, it interrupts the SMP. If a catastrophic failure is detected, the SMC asserts a system error (SERR) signal which is connected to the EISA controller ESC to produce an NMI signal. The SMC stores the first error detected in the "First Error Register" and all detected errors in the "Error Register" to allow a more intelligent failure analysis.

The interrupt routing scheme according to the preferred embodiment is shown in FIG. 5. All interrupts from the SMM components (such as PCMCIA adapters 194, 195, SMP 150, keyboard and mouse controller 185, and SMR 325) are routed through SMC 200. The SMC 200 also receives interrupt requests from SMR's 71, 72, 73 on GI bus 70, and from SMR 76 on ICIB bus 65. The SMC 200 also receives EISA interrupt signals on the APIC bus 80. Interrupts are routed from the SMC 200 to SMP 150 on APIC bus 80. In one embodiment of the invention, a second SMC 300 is provided on a secondary PCI bus 350. The second SMC 300 couples to the APIC bus 80 and ICIB bus 65 to assist in processing interrupt requests from the secondary PCI bus.

By routing all interrupt requests through the system management central (SMC), the SMC 200 is capable of masking interrupt signals from disabled PCI and EISA components. As the interrupt control device for the system, the SMC 200 also can reassign interrupts to devices in the system, including hot spare components in one of the embodiments of the present invention. In addition, the SMC facilitates the operation of the SMM 100 in a virtual terminal mode because all interrupts come through the SMM.

The GI bus and the ICIB bus preferably are busses connecting the SMR's and the SMC's. Preferably, the SMR has common pins for the GI and ICIB busses. Thus, the SMR is configured for operating in either mode. The GI bus and ICIB busses only require four lines, three of which already are present in the system (Vcc, ground, and the JTAG clock). The fourth line is a bi-directional data line. Referring now to FIGS. 2 and 5, GI bus 70 couples SMR 71, SMR 72 and SMR 73 to the system management module 100. The ICIB bus 65 couples the SMR 76 located on the EISA bus to the system management module 100. The GI bus 70 and the ICIB bus 65 permit bi-directional transmission of interrupts from different sources with the SMM 100 being able to infer information about the interrupt by knowing the time during which the interrupt was asserted. The GI bus and ICIB bus use time division multiplexing schemes to safely allow multiple devices to assert their interrupts on the same line for the SMC to sample. The SMC may also drive the same line. Thus, the GI bus and the ICIB bus are used to pass interrupt signals from remote devices to the SMM 100. Interrupts on the EISA bus may also be transmitted to the SMM via the ICIB bus 65. Each of the various interrupt transmission routes preferably are individually programmable and maskable by the SMM.

In the preferred embodiment of FIG. 4, the system management processor 150 dynamically ascertains the JTAG topology as part of system initialization. In accordance with known techniques described in the IEEE 1149.1 standard test access port description, software running on the SMP 150 performs an ID scan to determine what chips and what JTAG topology are present in the system. After determining that the system contains one or more SMR's, which serve as JTAG bridges, the software can use the SMR's to connect to other JTAG chains and perform an ID scan to determine the topology of this chain. As shown in FIG. 4, the SMC 200 preferably includes a IEEE 1149.1 standard test controller 220. The test controller 220 allows the SMP 150 to run a boundary scan of all scanable components in the computer system. The IEEE 1149.1 compatible bus controller 220 includes a response FIFO set which allows the SMP 150 to pipeline several commands to the JTAG port. The SMP 150 is capable of reporting the various conditions of the computer system to the operator via the computer screen display or through the modem or local area network connected through the PCMCIA slots 195, 196.

The IEEE 1149.1 compatible bus controller 220 interfaces the SMC 200 to the IEEE 1149.1 standard test bus 81. Each of the SMR's 71, 72, 73, 76 preferably includes a register to control multiplexing in the SMR. The register preferably is included in the JTAG data chain to permit modification of the state of the multiplexer. A JTAG master device permits the IEEE 1149.1 standard test bus to be used for testing and management communications in accordance with the preferred embodiment. Thus, the IEEE 1149.1 standard test bus is used to perform serial communications between the SMR and SMC as well as function as a test in accordance with normal techniques. In the preferred embodiment, PCI masters can scan the SMC and thus the SMP via the IEEE 1149.1 standard test bus. Thus, for example, the host CPU can scan the system management module via the IEEE 1149.1 standard test bus if desired.

The system management remote (SMR) devices 71, 72, 73 connect to the SMC 200 for gathering interrupt information from remote sources, such as various processor, memory, and I/O cards. The SMR's are implemented with relatively small ASIC's to minimize cost. Thus, one SMC can be used with many SMRs to allow the SMM 100 to monitor the rest of the computer system. One SMR preferably is physically located in the SMM 100, and the other SMR's are located in various remote modules. Interrupts provided by SMR's are gathered using time division multiplexing by the interrupt controller 235 in the SMC 200 over a bus GIBUS 70. The SMR 76 is located in the expansion subsystem. The SMR 76 receives the EISA IRQ signals and passes the interrupts via the bi-directional serial link bus ICIB 65 to the interrupt controller 235. The function of the SMR's could also include filtering the interrupts to remove positive glitches and stretching negative pulsing interrupts. Once the SMC 200 receives an interrupt from one of the SMRs, it performs a determination of the source of the interrupt. If the source of an interrupt is unknown due to slot sharing, the SMP 150 scans the SMR's registers via the IEEE 1149.1 compatible bus controller 220 to determine the interrupt source.

Referring still to FIG. 4, APIC I/O 215 functions to interface the SMC 200 to the APIC bus 80. In the preferred embodiment, the SMC 200 implements a remote read operation used in the I/O APIC which permits the SMC 200 to read the host processor's internal states as part of a diagnostic feature. The I/O APIC logic 215 also preferably supports interrupt routing from the SMC to the host on the APIC bus 80 in the event that the host CPU does not support APIC protocol.

In the preferred embodiment, the SMC survives a system power down and also is capable of surviving a PCI clock failure. The SMC 200 preferably reports other clock failures such as an APIC clock failure. The SMP monitors temperature and fan speed and can identify blocked or failed fans and even predict imminent over-temperature or imminent fan failure. Temperature preferably is read from a temperature sensor attached to the SMR via the Philip's IIC bus. SMR 76 preferably couples to the SMM via IEEE bus. Thus, the SMR 76 can transmit to the system management module 100 information regarding asset management, failure modes, run time logs, diagnostic or operating systems which flagged any failure, and other information.

In the preferred embodiment, the SMC 200 includes two individual registers for storing error values. One register latches the first occurrence of an error and the second register latches all occurrences of errors. The SMC stores the first error detected in the first error register and all detected errors in the error register to allow a more intelligent failure analysis. The SMC 200 also latches and reports PCI address, data parity errors, SERR#, clock failures, and all failures can be masked. The SMC also supports reporting via the interrupt or other signal lines to the host or system management module. The SMC also includes self error register bits as well as EISA and system hang logic.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

Numerous variations and modifications will become apparent to those skilled in the art once the above disclosure is fully appreciated. It is intended that the following claims be interpreted to embrace all such variations and modifications.

I claim:
1. A computer system, comprising:
   a host processor connected to a host bus;
   a memory controller coupled to said host bus, said memory controller connected to a host memory to control transactions to said host memory;
   a bus bridge interfacing the host bus to a system bus;
   a plurality of bus master devices connected to said system bus;
   a plurality of targets connected to said system bus;
   a system bus arbitration unit for controlling mastership of said system bus;
   a register associated with said arbitration unit for assigning priority to certain master-target combinations;
   wherein said bus arbitration unit receives mastership requests from said bus master devices, and said arbitration unit awards priority to a current master if the current master-target combination has been assigned priority in said register and if the current master is again requesting mastership of the system bus.

2. A system as in claim 1, wherein the arbitration unit and register reside in a system management module.

3. A system as in claim 2, wherein the system bus comprises a PCI bus.

4. A system as in claim 3, wherein the priority master-target combinations are programmed into said register.

5. A system as in claim 4, wherein the system management module includes a system management processor connected to said arbitration unit through a system management local bus.

6. A system as in claim 5, wherein the arbitration unit and associated register forms part of a system management interface unit.

7. A system as in claim 6, wherein the system management interface unit includes registers for storing information regarding pending cycles.

8. A method for granting mastership requests for a system bus, comprising:
   receiving a mastership request from a system bus master;
   granting the mastership request to the system bus master;
   identifying the target of the system bus master;
   determining if the master-target combination is a priority transaction;
   assigning priority to the system bus master in the event the system bus master requests further mastership of the system bus.

9. A method as in claim 8, wherein the step of granting the mastership request is made on the basis of a pre-assigned priority ranking of masters.

10. A method as in claim 8, wherein the priority transactions are programmed into the system during system initialization.

11. A method for granting mastership requests for a system bus, comprising:
   receiving a mastership request during the current arbitration cycle from a system bus master;
   granting the mastership request during the current arbitration cycle to the system bus master;
   identifying the target of the system bus master, wherein granting the mastership request is based upon a round-robin methodology;
   determining if the master-target combination formed by the system bus master and the target is a priority transaction; and assigning priority to the system bus master in the event the system bus master requests mastership of the system bus during the next arbitration cycle and if the master-target combination is a priority transaction.

12. A network server system, comprising:

a host processor connected to a host bus;

a PCI bus bridge interfacing the host bus to a PCI bus;

a system management module connected to said PCI bus, said system management module including a system management processor, a system management control interface unit and a priority register;

said system management control interface unit including arbitration logic which operates as the arbitrator for the PCI bus;

a plurality of PCI bus master devices connected to the PCI bus;

a plurality of targets on the PCI bus;

wherein the priority register has stored therein priority master-target combinations; and said arbitration logic awards priority based in part on the priority master-target combination stored in said priority register.

13. A server system as in claim 12, wherein said arbitration logic monitors a target of a current transaction after awarding a mastership requests.

14. A system as in claim 13, wherein said arbitration logic identifies and stores a value representing a master that is currently granted mastership of the PCI bus.

15. A system as in claim 14, wherein said arbitration logic compares the master-target combination to priority master-target combinations stored in the priority registers.

16. A system as in claim 15, wherein the arbitration logic gives priority to a current master if the current master-target combination is a priority combination.

* * * * *

UNITED STATES PATENT AND TRADEMARK OFFICE
CERTIFICATE OF CORRECTION

PATENT NO. : 5,907,689
DATED : May 25, 1999
INVENTOR(S) : Siamak TAVALLAEI, Gary B. KOTZUR and Eric E. ROSE It is certified that error appears in the above-identified patent and that said Letters Patent is hereby corrected as shown below:

On the title page item [75],

Inventors: "Siamak Tavallaei; Gary B. Kotzur both of Spring, Tex." should read --Siamak Tavallaei; Gary B. Kotzur; and Eric E. Rose all of Spring, Tex.--;

Column 10, Table I change "Variabie" to --Variable--;

Column 22, Table III change "0:Hostbridge" to --0:Host bridge--;

Column 22, Table III change "3:DEC Bndge" to --3:DEC Bridge--;

Column 22, Table III change "(ro) Tracker FIFO Control/Status (overrun) if set," to --(ro) Tracker FIFO Control/Status (Overrun) if set,--;

Column 32, Line 57 change "the" to --a--;

Column 32, Line 61 after "master" insert --, wherein granting the mastership request is based upon a round-robin methodology--; and

UNITED STATES PATENT AND TRADEMARK OFFICE
CERTIFICATE OF CORRECTION

PATENT NO. : 5,907,689
DATED : May 25, 1999
INVENTOR(S) : Siamak TAVALLAEI, Gary B. KOTZUR and Eric E. ROSE It is certified that error appears in the above-identified patent and that said Letters Patent is hereby corrected as shown below:

Column 32, Line 62 after "master" delete --, wherein granting the mastership request is based upon a round-robin methodology;--

Signed and Sealed this

Twenty-ninth Day of February, 2000

Attest:

Q. TODD DICKINSON

Attesting Officer

Commissioner of Patents and Trademarks